United States Patent
Jain et al.

(10) Patent No.: US 10,230,566 B1
(45) Date of Patent: Mar. 12, 2019

(54) METHODS FOR DYNAMICALLY CONSTRUCTING A SERVICE PRINCIPAL NAME AND DEVICES THEREOF

(71) Applicant: F5 Networks, Inc., Seattle, WA (US)

(72) Inventors: Amit Jain, Santa Clara, CA (US); Konstantin Martynenko, Seattle, WA (US); Jeff Costlow, Bellevue, WA (US); David Holmes, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 731 days.

(21) Appl. No.: 13/731,119

(22) Filed: Dec. 31, 2012

Related U.S. Application Data (60) Provisional application No. 61/600,416, filed on Feb. 17, 2012.

(51) Int. Cl.
| | | |
|---|---|---|
| *G06F 15/16* | (2006.01) | |
| *H04L 12/24* | (2006.01) | |
| *H04L 29/06* | (2006.01) | |

(52) U.S. Cl.
CPC ............ *H04L 41/00* (2013.01); *H04L 63/083* (2013.01); *H04L 63/0815* (2013.01)

(58) Field of Classification Search
CPC ..... H04L 9/32; H04L 63/083; H04L 63/0815; H04L 9/00; H04L 41/00
(Continued)

(56) References Cited

U.S. PATENT DOCUMENTS

| | | |
|---|---|---|
| 3,950,735 A | 4/1976 | Patel |
| 4,644,532 A | 2/1987 | George et al. |

(Continued)

FOREIGN PATENT DOCUMENTS

| | | |
|---|---|---|
| CA | 2080530 A1 | 4/1994 |
| EP | 0605088 A3 | 2/1996 |

(Continued)

OTHER PUBLICATIONS

F5 Networks, Inc., "BIG-IP Controller with Exclusive OneConnect Content Switching Feature Provides a Breakthrough System for Maximizing Server and Network Performance," Press Release, May 8, 2001, 2 pages, Las Vegas, Nevada.

(Continued)

*Primary Examiner* — David R Lazaro
*Assistant Examiner* — Mariegeorges A Henry
(74) *Attorney, Agent, or Firm* — LeClairRyan PLLC (57) ABSTRACT

A system, medium and method for dynamically constructing a service principal name is disclosed. A client request from a user to access a service is received at a network traffic management device which identifies an internet protocol (IP) address of a selected backend server to provide the requested service to the client. The network traffic management device identifies a hostname of the selected backend server based at least on the identified IP address and dynamically generates a service principal name (SPN) of the selected backend server based on the determined host name. The network traffic management device obtains a service ticket from a domain controller server using at least the generated SPN of the selected backend server. The network traffic management device uses the obtained service ticket along with the client request to provide the user access to the selected backend server for the client request.

16 Claims, 3 Drawing Sheets

(58) Field of Classification Search
USPC .......................... 709/224; 726/10; 713/168
See application file for complete search history.

(56) References Cited

U.S. PATENT DOCUMENTS

| | | | |
|---|---|---|---|
| 4,897,781 A | 1/1990 | Chang et al. |
| 4,965,772 A | 10/1990 | Daniel et al. |
| 5,023,826 A | 6/1991 | Patel |
| 5,053,953 A | 10/1991 | Patel |
| 5,167,024 A | 11/1992 | Smith et al. |
| 5,282,201 A | 1/1994 | Frank et al. |
| 5,299,312 A | 3/1994 | Rocco, Jr. |
| 5,327,529 A | 7/1994 | Fults et al. |
| 5,367,635 A | 11/1994 | Bauer et al. |
| 5,371,852 A | 12/1994 | Attanasio et al. |
| 5,406,502 A | 4/1995 | Haramaty et al. |
| 5,475,857 A | 12/1995 | Dally |
| 5,517,617 A | 5/1996 | Sathaye et al. |
| 5,519,694 A | 5/1996 | Brewer et al. |
| 5,519,778 A | 5/1996 | Leighton et al. |
| 5,521,591 A | 5/1996 | Arora et al. |
| 5,528,701 A | 6/1996 | Aref |
| 5,550,816 A | 8/1996 | Hardwick et al. |
| 5,581,764 A | 12/1996 | Fitzgerald et al. |
| 5,596,742 A | 1/1997 | Agarwal et al. |
| 5,606,665 A | 2/1997 | Yang et al. |
| 5,611,049 A | 3/1997 | Pitts |
| 5,623,490 A | 4/1997 | Richter et al. |
| 5,663,018 A | 9/1997 | Cummings et al. |
| 5,752,023 A | 5/1998 | Choucri et al. |
| 5,761,484 A | 6/1998 | Agarwal et al. |
| 5,768,423 A | 6/1998 | Aref et al. |
| 5,774,660 A | 6/1998 | Brendel et al. |
| 5,790,554 A | 8/1998 | Pitcher et al. |
| 5,793,302 A | 8/1998 | Stambler |
| 5,802,052 A | 9/1998 | Venkataraman |
| 5,812,550 A | 9/1998 | Sohn et al. |
| 5,825,772 A | 10/1998 | Dobbins et al. |
| 5,832,283 A | 11/1998 | Chou et al. |
| 5,862,326 A | 1/1999 | Bapat |
| 5,875,296 A | 2/1999 | Shi et al. |
| 5,892,914 A | 4/1999 | Pitts |
| 5,892,932 A | 4/1999 | Kim |
| 5,905,872 A | 5/1999 | DeSimone et al. |
| 5,919,247 A | 7/1999 | Van Hoff et al. |
| 5,936,939 A | 8/1999 | Des Jardins et al. |
| 5,941,988 A | 8/1999 | Bhagwat et al. |
| 5,946,690 A | 8/1999 | Pitts |
| 5,949,885 A | 9/1999 | Leighton |
| 5,951,694 A | 9/1999 | Choquier et al. |
| 5,959,990 A | 9/1999 | Frantz et al. |
| 5,974,148 A | 10/1999 | Stambler |
| 5,974,460 A | 10/1999 | Maddalozzo, Jr. et al. |
| 5,983,281 A | 11/1999 | Ogle et al. |
| 5,988,847 A | 11/1999 | McLaughlin et al. |
| 5,991,302 A | 11/1999 | Berl et al. |
| 5,995,491 A | 11/1999 | Richter et al. |
| 6,006,260 A | 12/1999 | Barrick, Jr. et al. |
| 6,006,264 A | 12/1999 | Colby et al. |
| 6,026,452 A | 2/2000 | Pitts |
| 6,026,500 A | 2/2000 | Topff et al. |
| 6,028,857 A | 2/2000 | Poor |
| 6,029,175 A | 2/2000 | Chow et al. |
| 6,041,365 A | 3/2000 | Kleinerman |
| 6,046,979 A | 4/2000 | Bauman |
| 6,047,356 A | 4/2000 | Anderson et al. |
| 6,051,169 A | 4/2000 | Brown et al. |
| 6,067,558 A | 5/2000 | Wendt et al. |
| 6,078,956 A | 6/2000 | Bryant et al. |
| 6,085,234 A | 7/2000 | Pitts et al. |
| 6,092,196 A | 7/2000 | Reiche |
| 6,104,706 A | 8/2000 | Richter et al. |
| 6,108,703 A | 8/2000 | Leighton et al. |
| 6,111,876 A | 8/2000 | Frantz et al. |
| 6,128,279 A | 10/2000 | O'Neil et al. |
| 6,128,657 A | 10/2000 | Okanoya et al. |
| 6,154,777 A | 11/2000 | Ebrahim |
| 6,157,950 A | 12/2000 | Krishnan |
| 6,160,874 A | 12/2000 | Dickerman et al. |
| 6,170,022 B1 | 1/2001 | Linville et al. |
| 6,178,423 B1 | 1/2001 | Douceur et al. |
| 6,182,139 B1 | 1/2001 | Brendel |
| 6,192,051 B1 | 2/2001 | Lipman et al. |
| 6,233,612 B1 | 5/2001 | Fruchtman et al. |
| 6,246,684 B1 | 6/2001 | Chapman et al. |
| 6,253,226 B1 | 6/2001 | Chidambaran et al. |
| 6,253,230 B1 | 6/2001 | Couland et al. |
| 6,259,405 B1 | 7/2001 | Stewart et al. |
| 6,260,070 B1 | 7/2001 | Shah |
| 6,263,368 B1 | 7/2001 | Martin |
| 6,289,012 B1 | 9/2001 | Harrington et al. |
| 6,292,832 B1 | 9/2001 | Shah et al. |
| 6,298,380 B1 | 10/2001 | Coile et al. |
| 6,304,913 B1 | 10/2001 | Rune |
| 6,311,278 B1 | 10/2001 | Raanan et al. |
| 6,327,622 B1 | 12/2001 | Jindal et al. |
| 6,330,574 B1 | 12/2001 | Murashita |
| 6,336,147 B1 | 1/2002 | Brownell et al. |
| 6,338,082 B1 | 1/2002 | Schneider |
| 6,343,324 B1 | 1/2002 | Hubis et al. |
| 6,347,339 B1 | 2/2002 | Morris et al. |
| 6,353,848 B1 | 3/2002 | Morris |
| 6,360,270 B1 | 3/2002 | Cherkasova et al. |
| 6,363,056 B1 | 3/2002 | Beigi et al. |
| 6,370,527 B1 | 4/2002 | Singhal |
| 6,374,300 B2 | 4/2002 | Masters |
| 6,389,462 B1 | 5/2002 | Cohen et al. |
| 6,396,833 B1 | 5/2002 | Zhang et al. |
| 6,411,986 B1 | 6/2002 | Susai et al. |
| 6,430,562 B1 | 8/2002 | Kardos et al. |
| 6,434,081 B1 | 8/2002 | Johnson et al. |
| 6,446,108 B1 | 9/2002 | Rosenberg et al. |
| 6,466,580 B1 | 10/2002 | Leung |
| 6,469,983 B2 | 10/2002 | Narayana et al. |
| 6,480,476 B1 | 11/2002 | Willars |
| 6,484,261 B1 | 11/2002 | Wiegel |
| 6,490,624 B1 | 12/2002 | Sampson et al. |
| 6,510,135 B1 | 1/2003 | Almulhem et al. |
| 6,510,458 B1 | 1/2003 | Berstis et al. |
| 6,513,061 B1 | 1/2003 | Ebata et al. |
| 6,514,085 B2 | 2/2003 | Slattery et al. |
| 6,519,643 B1 | 2/2003 | Foulkes et al. |
| 6,542,936 B1 | 4/2003 | Mayle et al. |
| 6,560,230 B1 | 5/2003 | Li et al. |
| 6,578,069 B1 | 6/2003 | Hopmann et al. |
| 6,601,084 B1 | 7/2003 | Bhaskaran et al. |
| 6,615,267 B1 | 9/2003 | Whalen et al. |
| 6,631,422 B1 | 10/2003 | Althaus et al. |
| 6,636,503 B1 | 10/2003 | Shiran et al. |
| 6,636,894 B1 | 10/2003 | Short et al. |
| 6,650,640 B1 | 11/2003 | Muller et al. |
| 6,650,641 B1 | 11/2003 | Albert et al. |
| 6,654,346 B1 | 11/2003 | Mahalingaiah et al. |
| 6,654,701 B2 | 11/2003 | Hatley |
| 6,661,802 B1 | 12/2003 | Homberg et al. |
| 6,683,873 B1 | 1/2004 | Kwok et al. |
| 6,691,165 B1 | 2/2004 | Bruck et al. |
| 6,694,517 B1 | 2/2004 | James et al. |
| 6,701,415 B1 | 3/2004 | Hendren, III |
| 6,708,187 B1 | 3/2004 | Shanumgam et al. |
| 6,708,220 B1 | 3/2004 | Olin |
| 6,718,380 B1 | 4/2004 | Mohaban et al. |
| 6,728,704 B2 | 4/2004 | Mao et al. |
| 6,738,357 B1 | 5/2004 | Richter et al. |
| 6,742,045 B1 | 5/2004 | Albert et al. |
| 6,744,776 B1 | 6/2004 | Kalkunte et al. |
| 6,751,663 B1 | 6/2004 | Farrell et al. |
| 6,754,215 B1 | 6/2004 | Arikawa et al. |
| 6,754,228 B1 | 6/2004 | Ludwig |
| 6,754,699 B2 | 6/2004 | Swildens et al. |
| 6,760,337 B1 | 7/2004 | Snyder, II et al. |
| 6,760,775 B1 | 7/2004 | Anerousis et al. |
| 6,772,219 B1 | 8/2004 | Shobatake |
| 6,779,039 B1 | 8/2004 | Bominareddy et al. |

(56) References Cited

U.S. PATENT DOCUMENTS

| | | |
|---|---|---|
| 6,781,986 B1 | 8/2004 | Sabaa et al. |
| 6,795,860 B1 | 9/2004 | Shah |
| 6,798,777 B1 | 9/2004 | Ferguson et al. |
| 6,804,542 B1 | 10/2004 | Haartsen |
| 6,816,901 B1 | 11/2004 | Sitaraman et al. |
| 6,816,977 B2 | 11/2004 | Brakmo et al. |
| 6,826,698 B1 | 11/2004 | Minkin et al. |
| 6,829,238 B2 | 12/2004 | Tokuyo et al. |
| 6,829,649 B1 | 12/2004 | Shorey |
| 6,857,009 B1 | 2/2005 | Ferreria |
| 6,862,282 B1 | 3/2005 | Oden |
| 6,865,593 B1 | 3/2005 | Reshef et al. |
| 6,868,082 B1 | 3/2005 | Allen, Jr. et al. |
| 6,868,447 B1 | 3/2005 | Slaughter et al. |
| 6,871,221 B1 | 3/2005 | Styles |
| 6,876,629 B2 | 4/2005 | Beshai et al. |
| 6,876,654 B1 | 4/2005 | Hegde |
| 6,880,017 B1 | 4/2005 | Marce et al. |
| 6,883,137 B1 | 4/2005 | Girardot et al. |
| 6,888,836 B1 | 5/2005 | Cherkasova |
| 6,904,040 B2 | 6/2005 | Salapura et al. |
| 6,914,881 B1 | 7/2005 | Mansfield et al. |
| 6,928,082 B2 | 8/2005 | Liu et al. |
| 6,928,518 B2 | 8/2005 | Talagala |
| 6,947,985 B2 | 9/2005 | Hegli et al. |
| 6,950,434 B1 | 9/2005 | Viswanath et al. |
| 6,954,780 B2 | 10/2005 | Susai et al. |
| 6,957,272 B2 | 10/2005 | Tallegas et al. |
| 6,959,394 B1 | 10/2005 | Brickell et al. |
| 6,970,475 B1 | 11/2005 | Fraser et al. |
| 6,970,924 B1 | 11/2005 | Chu et al. |
| 6,973,490 B1 | 12/2005 | Robertson et al. |
| 6,975,592 B1 | 12/2005 | Seddigh et al. |
| 6,986,040 B1 | 1/2006 | Kramer et al. |
| 6,987,763 B2 | 1/2006 | Rochberger et al. |
| 6,990,074 B2 | 1/2006 | Wan et al. |
| 6,990,114 B1 | 1/2006 | Erimli et al. |
| 7,003,564 B2 | 2/2006 | Greuel et al. |
| 7,006,502 B2 | 2/2006 | Lin |
| 7,007,092 B2 | 2/2006 | Peiffer |
| 7,020,713 B1 | 3/2006 | Shah et al. |
| 7,023,974 B1 | 4/2006 | Brannam et al. |
| 7,035,212 B1 | 4/2006 | Mittal et al. |
| 7,039,061 B2 | 5/2006 | Connor et al. |
| 7,058,633 B1 | 6/2006 | Gnagy et al. |
| 7,065,482 B2 | 6/2006 | Shorey et al. |
| 7,075,924 B2 | 7/2006 | Richter et al. |
| 7,076,689 B2 | 7/2006 | Atkinson |
| 7,080,314 B1 | 7/2006 | Garofalakis et al. |
| 7,089,491 B2 | 8/2006 | Feinberg et al. |
| 7,113,993 B1 | 9/2006 | Cappiello et al. |
| 7,113,996 B2 | 9/2006 | Kronenberg |
| 7,120,666 B2 | 10/2006 | McCanne et al. |
| 7,133,863 B2 | 11/2006 | Teng et al. |
| 7,133,944 B2 | 11/2006 | Song et al. |
| 7,139,792 B1 | 11/2006 | Mishra et al. |
| 7,155,722 B1 | 12/2006 | Hilla et al. |
| 7,161,904 B2 | 1/2007 | Hussain et al. |
| 7,185,359 B2 | 2/2007 | Schmidt et al. |
| 7,191,163 B2 | 3/2007 | Herrera et al. |
| 7,206,282 B1 | 4/2007 | Goldman et al. |
| 7,228,359 B1 | 6/2007 | Monteiro |
| 7,228,422 B2 | 6/2007 | Morioka et al. |
| 7,236,491 B2 | 6/2007 | Tsao et al. |
| 7,240,100 B1 | 7/2007 | Wein et al. |
| 7,257,633 B2 | 8/2007 | Masputra et al. |
| 7,283,470 B1 | 10/2007 | Sindhu et al. |
| 7,287,082 B1 | 10/2007 | O'Toole, Jr. |
| 7,292,541 B1 | 11/2007 | CS |
| 7,295,827 B2 | 11/2007 | Liu et al. |
| 7,296,263 B1 | 11/2007 | Jacob |
| 7,308,475 B1 | 12/2007 | Pruitt et al. |
| 7,308,703 B2 | 12/2007 | Wright et al. |
| 7,308,709 B1* | 12/2007 | Brezak et al. .................. 726/10 |
| 7,310,339 B1 | 12/2007 | Powers et al. |
| 7,319,696 B2 | 1/2008 | Inoue et al. |
| 7,321,926 B1 | 1/2008 | Zhang et al. |
| 7,324,533 B1 | 1/2008 | DeLiberato et al. |
| 7,333,999 B1 | 2/2008 | Njemanze |
| 7,340,571 B2 | 3/2008 | Saze |
| 7,343,413 B2 | 3/2008 | Gilde et al. |
| 7,349,391 B2 | 3/2008 | Ben-Dor et al. |
| 7,373,438 B1 | 5/2008 | DeBergalis et al. |
| 7,383,570 B2 | 6/2008 | Pinkas et al. |
| 7,398,552 B2 | 7/2008 | Pardee et al. |
| 7,409,440 B1 | 8/2008 | Jacob |
| 7,433,962 B2 | 10/2008 | Janssen et al. |
| 7,437,478 B2 | 10/2008 | Yokota et al. |
| 7,454,480 B2 | 11/2008 | Labio et al. |
| 7,490,162 B1* | 2/2009 | Masters .................. 709/238 |
| 7,500,243 B2 | 3/2009 | Huetsch et al. |
| 7,500,269 B2 | 3/2009 | Huotari et al. |
| 7,505,795 B1 | 3/2009 | Lim et al. |
| 7,516,492 B1 | 4/2009 | Nisbet et al. |
| 7,522,581 B2 | 4/2009 | Acharya et al. |
| 7,526,541 B2 | 4/2009 | Roese et al. |
| 7,555,608 B2 | 6/2009 | Naik et al. |
| 7,558,197 B1 | 7/2009 | Sindhu et al. |
| 7,577,723 B2 | 8/2009 | Matsuda et al. |
| 7,580,971 B1 | 8/2009 | Gollapudi et al. |
| 7,590,732 B2 | 9/2009 | Rune |
| 7,624,424 B2 | 11/2009 | Morita et al. |
| 7,640,347 B1 | 12/2009 | Sloat et al. |
| 7,644,137 B2 | 1/2010 | Bozak et al. |
| 7,668,166 B1 | 2/2010 | Rekhter et al. |
| 7,680,915 B2 | 3/2010 | Still et al. |
| 7,684,423 B2 | 3/2010 | Tripathi et al. |
| 7,689,710 B2 | 3/2010 | Tang et al. |
| 7,698,458 B1 | 4/2010 | Liu et al. |
| 7,706,261 B2 | 4/2010 | Sun et al. |
| 7,724,657 B2 | 5/2010 | Rao et al. |
| 7,725,093 B2 | 5/2010 | Sengupta et al. |
| 7,778,187 B2 | 8/2010 | Chaturvedi et al. |
| 7,801,978 B1 | 9/2010 | Susai et al. |
| 7,808,913 B2 | 10/2010 | Ansari et al. |
| 7,822,839 B1 | 10/2010 | Pruitt et al. |
| 7,831,662 B2 | 11/2010 | Clark et al. |
| 7,861,085 B1 | 12/2010 | Case et al. |
| 7,876,677 B2 | 1/2011 | Cheshire |
| 7,895,653 B2 | 2/2011 | Calo et al. |
| 7,903,554 B1 | 3/2011 | Manur et al. |
| 7,908,245 B2 | 3/2011 | Nakano et al. |
| 7,908,314 B2 | 3/2011 | Yamaguchi et al. |
| 7,925,908 B2 | 4/2011 | Kim |
| 7,930,365 B2 | 4/2011 | Dixit et al. |
| 7,933,496 B2 | 4/2011 | Livshits et al. |
| 7,933,946 B2 | 4/2011 | Livshits et al. |
| 7,945,908 B1 | 5/2011 | Waldspurger et al. |
| 7,958,222 B1 | 6/2011 | Pruitt et al. |
| 7,984,141 B2 | 7/2011 | Gupta et al. |
| 7,984,500 B1 | 7/2011 | Khanna et al. |
| 8,024,443 B1 | 9/2011 | Jacob |
| 8,037,528 B2 | 10/2011 | Williams et al. |
| 8,041,022 B1 | 10/2011 | Andreasen et al. |
| 8,064,342 B2 | 11/2011 | Badger |
| 8,069,225 B2 | 11/2011 | McCanne et al. |
| 8,103,781 B1 | 1/2012 | Wu et al. |
| 8,130,650 B2 | 3/2012 | Allen, Jr. et al. |
| 8,149,819 B2 | 4/2012 | Kobayashi et al. |
| 8,155,128 B2 | 4/2012 | Balyan et al. |
| 8,171,124 B2 | 5/2012 | Kondamuru |
| 8,189,567 B2 | 5/2012 | Kavanagh et al. |
| 8,190,769 B1 | 5/2012 | Shukla et al. |
| 8,199,757 B2 | 6/2012 | Pani et al. |
| 8,205,246 B2 | 6/2012 | Shatzkamer et al. |
| 8,239,954 B2 | 8/2012 | Wobber et al. |
| 8,271,620 B2 | 9/2012 | Witchey |
| 8,274,895 B2 | 9/2012 | Rahman et al. |
| 8,321,908 B2 | 11/2012 | Gai et al. |
| 8,351,333 B2 | 1/2013 | Rao et al. |
| 8,380,854 B2 | 2/2013 | Szabo |
| 8,396,836 B1 | 3/2013 | Ferguson et al. |
| 8,417,817 B1 | 4/2013 | Jacobs |
| 8,447,871 B1 | 5/2013 | Szabo |

(56) References Cited

U.S. PATENT DOCUMENTS

| | | | |
|---|---|---|---|
| 8,447,970 B2 | 5/2013 | Klein et al. |
| 8,452,876 B1 | 5/2013 | Williams et al. |
| 8,463,850 B1 | 6/2013 | McCann |
| 8,464,265 B2 | 6/2013 | Worley |
| 8,468,247 B1 | 6/2013 | Richardson et al. |
| 8,468,267 B2 | 6/2013 | Yigang |
| 8,521,851 B1 | 8/2013 | Richardson et al. |
| 8,521,880 B1 | 8/2013 | Richardson et al. |
| 8,359,224 B2 | 9/2013 | Henderson et al. |
| 8,539,224 B2 | 9/2013 | Henderson et al. |
| 8,560,693 B1 | 10/2013 | Wang et al. |
| 8,566,474 B2 | 10/2013 | Kanode et al. |
| 8,578,050 B2 | 11/2013 | Craig et al. |
| 8,601,000 B1 | 12/2013 | Stefani et al. |
| 8,606,921 B2 | 12/2013 | Vasquez et al. |
| 8,615,022 B2 | 12/2013 | Harrison et al. |
| 8,646,067 B2 | 2/2014 | Agarwal et al. |
| 8,665,868 B2 | 3/2014 | Kay |
| 8,665,969 B2 | 3/2014 | Kay |
| 8,701,179 B1 | 4/2014 | Penno et al. |
| 8,725,836 B2 | 5/2014 | Lowery et al. |
| 8,726,338 B2 | 5/2014 | Narayanaswamy et al. |
| 8,737,304 B2 | 5/2014 | Karuturi et al. |
| 8,778,665 B2 | 7/2014 | Glide et al. |
| 8,804,504 B1 | 8/2014 | Chen |
| 8,819,109 B1 | 8/2014 | Krishnamurthy et al. |
| 8,819,419 B1 | 8/2014 | Carlson et al. |
| 8,819,768 B1 | 8/2014 | Koeten et al. |
| 8,830,874 B2 | 9/2014 | Cho et al. |
| 8,838,817 B1 | 9/2014 | Biswas |
| 8,873,753 B2 | 10/2014 | Parker |
| 8,875,274 B2 | 10/2014 | Montemurro et al. |
| 8,879,431 B2 | 11/2014 | Ridel et al. |
| 8,886,981 B1 | 11/2014 | Baumann et al. |
| 8,908,545 B1 | 12/2014 | Chen et al. |
| 8,954,080 B2 | 2/2015 | Janakiraman et al. |
| 8,954,492 B1 | 2/2015 | Lowell, Jr. |
| 8,959,215 B2 | 2/2015 | Koponen et al. |
| 9,036,529 B2 | 5/2015 | Erickson et al. |
| 9,037,166 B2 | 5/2015 | de Wit et al. |
| 9,047,259 B1 | 6/2015 | Ho et al. |
| 9,077,554 B1 | 7/2015 | Szabo |
| 9,083,760 B1 | 7/2015 | Hughes et al. |
| 9,137,301 B1 | 9/2015 | Dunlap |
| 9,143,451 B2 | 9/2015 | Amdahl et al. |
| 9,244,843 B1 | 1/2016 | Michels et al. |
| 9,497,614 B1 | 11/2016 | Ridel et al. |
| 2001/0000083 A1 | 3/2001 | Crow et al. |
| 2001/0007560 A1 | 7/2001 | Masuda et al. |
| 2001/0009554 A1 | 7/2001 | Katseff et al. |
| 2001/0023442 A1 | 9/2001 | Masters |
| 2002/0010757 A1 | 1/2002 | Granik et al. |
| 2002/0010783 A1 | 1/2002 | Primak et al. |
| 2002/0012352 A1 | 1/2002 | Hansson et al. |
| 2002/0032758 A1 | 1/2002 | Yen et al. |
| 2002/0032777 A1 | 3/2002 | Kawata et al. |
| 2002/0038360 A1 | 3/2002 | Andrews et al. |
| 2002/0046291 A1 | 4/2002 | O'Callaghan et al. |
| 2002/0049842 A1 | 4/2002 | Huetsch et al. |
| 2002/0059428 A1 | 5/2002 | Susai et al. |
| 2002/0065848 A1 | 5/2002 | Walker et al. |
| 2002/0072048 A1 | 6/2002 | Slattery et al. |
| 2002/0083067 A1 | 6/2002 | Tamayo et al. |
| 2002/0087571 A1 | 7/2002 | Stapel et al. |
| 2002/0087744 A1 | 7/2002 | Kitchin |
| 2002/0095498 A1 | 7/2002 | Chanda et al. |
| 2002/0099829 A1 | 7/2002 | Richards et al. |
| 2002/0099842 A1 | 7/2002 | Jennings et al. |
| 2002/0103823 A1 | 8/2002 | Jackson et al. |
| 2002/0112061 A1 | 8/2002 | Shih et al. |
| 2002/0138615 A1 | 9/2002 | Schmeling |
| 2002/0143819 A1 | 10/2002 | Han et al. |
| 2002/0143852 A1 | 10/2002 | Guo et al. |
| 2002/0161913 A1 | 10/2002 | Gonzalez et al. |
| 2002/0162118 A1 | 10/2002 | Levy et al. |
| 2002/0174216 A1 | 11/2002 | Shorey et al. |
| 2002/0188753 A1* | 12/2002 | Tang et al. ............... 709/237 |
| 2002/0194112 A1 | 12/2002 | DePinto et al. |
| 2002/0194342 A1 | 12/2002 | Lu et al. |
| 2002/0198956 A1 | 12/2002 | Dunshea et al. |
| 2002/0198993 A1 | 12/2002 | Cudd et al. |
| 2003/0005144 A1 | 1/2003 | Engel et al. |
| 2003/0005172 A1 | 1/2003 | Chessell |
| 2003/0009528 A1 | 1/2003 | Sharif et al. |
| 2003/0018450 A1 | 1/2003 | Carley |
| 2003/0018585 A1 | 1/2003 | Butler et al. |
| 2003/0018927 A1 | 1/2003 | Gadir et al. |
| 2003/0034905 A1 | 2/2003 | Anton et al. |
| 2003/0037070 A1 | 2/2003 | Marston |
| 2003/0046291 A1 | 3/2003 | Fascenda |
| 2003/0046335 A1 | 3/2003 | Doyle et al. |
| 2003/0051045 A1 | 3/2003 | Connor |
| 2003/0055723 A1 | 3/2003 | English |
| 2003/0065653 A1 | 4/2003 | Overton et al. |
| 2003/0065951 A1 | 4/2003 | Igeta et al. |
| 2003/0069918 A1 | 4/2003 | Lu et al. |
| 2003/0069974 A1 | 4/2003 | Lu et al. |
| 2003/0070069 A1 | 4/2003 | Belapurkar et al. |
| 2003/0074301 A1 | 4/2003 | Solomon |
| 2003/0086415 A1 | 5/2003 | Bernhard et al. |
| 2003/0105807 A1 | 6/2003 | Thompson et al. |
| 2003/0105846 A1 | 6/2003 | Zhao et al. |
| 2003/0105983 A1 | 6/2003 | Brakmo et al. |
| 2003/0108000 A1 | 6/2003 | Chaney et al. |
| 2003/0108002 A1 | 6/2003 | Chaney et al. |
| 2003/0108052 A1 | 6/2003 | Inoue et al. |
| 2003/0120948 A1* | 6/2003 | Schmidt et al. ............... 713/200 |
| 2003/0128708 A1 | 7/2003 | Inoue et al. |
| 2003/0130945 A1 | 7/2003 | Force |
| 2003/0131052 A1 | 7/2003 | Allan |
| 2003/0139934 A1 | 7/2003 | Mandera |
| 2003/0145062 A1 | 7/2003 | Sharma et al. |
| 2003/0145233 A1 | 7/2003 | Poletto et al. |
| 2003/0156586 A1 | 8/2003 | Lee et al. |
| 2003/0163576 A1 | 8/2003 | Janssen et al. |
| 2003/0179755 A1 | 9/2003 | Fraser |
| 2003/0189936 A1 | 10/2003 | Terrell et al. |
| 2003/0191812 A1 | 10/2003 | Agarwalla et al. |
| 2003/0195813 A1 | 10/2003 | Pallister et al. |
| 2003/0195962 A1 | 10/2003 | Kikuchi et al. |
| 2003/0208596 A1 | 11/2003 | Carolan et al. |
| 2003/0212954 A1 | 11/2003 | Patrudu |
| 2003/0220835 A1 | 11/2003 | Barnes, Jr. |
| 2003/0225485 A1 | 12/2003 | Fritz et al. |
| 2003/0229665 A1 | 12/2003 | Ryman |
| 2003/0236995 A1 | 12/2003 | Fretwell, Jr. |
| 2004/0003287 A1 | 1/2004 | Zissimopoulos et al. |
| 2004/0006591 A1 | 1/2004 | Matsui et al. |
| 2004/0015783 A1 | 1/2004 | Lennon et al. |
| 2004/0017825 A1 | 1/2004 | Stanwood et al. |
| 2004/0030627 A1 | 2/2004 | Sedukhin |
| 2004/0030740 A1 | 2/2004 | Stelting |
| 2004/0043758 A1 | 3/2004 | Sorvari et al. |
| 2004/0059789 A1 | 3/2004 | Shum |
| 2004/0064544 A1 | 4/2004 | Barsness et al. |
| 2004/0064554 A1 | 4/2004 | Kuno et al. |
| 2004/0072569 A1 | 4/2004 | Omae et al. |
| 2004/0093361 A1 | 5/2004 | Therrien et al. |
| 2004/0103206 A1 | 5/2004 | Hsu et al. |
| 2004/0103283 A1 | 5/2004 | Hornak |
| 2004/0111523 A1 | 6/2004 | Hall et al. |
| 2004/0111621 A1 | 6/2004 | Himberger et al. |
| 2004/0117493 A1 | 6/2004 | Bazot et al. |
| 2004/0122926 A1 | 6/2004 | Moore et al. |
| 2004/0123277 A1 | 6/2004 | Schrader et al. |
| 2004/0133605 A1 | 7/2004 | Chang et al. |
| 2004/0138858 A1 | 7/2004 | Carley |
| 2004/0141185 A1 | 8/2004 | Akama |
| 2004/0151186 A1 | 8/2004 | Akama |
| 2004/0167967 A1 | 8/2004 | Bastian et al. |
| 2004/0177165 A1 | 9/2004 | Masputra et al. |
| 2004/0192312 A1 | 9/2004 | Li et al. |
| 2004/0199762 A1 | 10/2004 | Carlson et al. |
| 2004/0210663 A1 | 10/2004 | Phillips et al. |

(56) References Cited

U.S. PATENT DOCUMENTS

| | | |
|---|---|---|
| 2004/0213156 A1 | 10/2004 | Smallwood et al. |
| 2004/0215665 A1 | 10/2004 | Edgar et al. |
| 2004/0215746 A1 | 10/2004 | McCanne et al. |
| 2004/0236826 A1 | 11/2004 | Harville et al. |
| 2004/0243703 A1 | 12/2004 | Demmer et al. |
| 2004/0255000 A1 | 12/2004 | Simionescu et al. |
| 2004/0260745 A1 | 12/2004 | Gage et al. |
| 2004/0264472 A1 | 12/2004 | Oliver et al. |
| 2004/0264481 A1 | 12/2004 | Darling et al. |
| 2004/0267920 A1 | 12/2004 | Hydrie et al. |
| 2004/0267948 A1 | 12/2004 | Oliver et al. |
| 2004/0268358 A1 | 12/2004 | Darling et al. |
| 2005/0004887 A1 | 1/2005 | Igakura et al. |
| 2005/0008017 A1 | 1/2005 | Datta et al. |
| 2005/0021703 A1 | 1/2005 | Cherry et al. |
| 2005/0021736 A1 | 1/2005 | Carusi et al. |
| 2005/0027841 A1 | 2/2005 | Rolfe |
| 2005/0027869 A1 | 2/2005 | Johnson |
| 2005/0044158 A1 | 2/2005 | Malik |
| 2005/0044213 A1 | 2/2005 | Kobayashi et al. |
| 2005/0052440 A1 | 3/2005 | Kim et al. |
| 2005/0055435 A1 | 3/2005 | Gbadegesin et al. |
| 2005/0071283 A1 | 3/2005 | Randle et al. |
| 2005/0078604 A1 | 4/2005 | Yim |
| 2005/0117589 A1 | 6/2005 | Douady et al. |
| 2005/0122942 A1 | 6/2005 | Rhee et al. |
| 2005/0122977 A1 | 6/2005 | Lieberman |
| 2005/0125553 A1 | 6/2005 | Wu et al. |
| 2005/0154837 A1 | 7/2005 | Keohane et al. |
| 2005/0165656 A1 | 7/2005 | Frederick et al. |
| 2005/0174944 A1 | 8/2005 | Legault et al. |
| 2005/0175013 A1 | 8/2005 | Le Pennec et al. |
| 2005/0187866 A1 | 8/2005 | Lee |
| 2005/0188220 A1 | 8/2005 | Nilsson et al. |
| 2005/0198234 A1 | 9/2005 | Leib et al. |
| 2005/0198310 A1 | 9/2005 | Kim et al. |
| 2005/0213587 A1 | 9/2005 | Cho et al. |
| 2005/0234928 A1 | 10/2005 | Shkvarchuk et al. |
| 2005/0240664 A1 | 10/2005 | Chen et al. |
| 2005/0246393 A1 | 11/2005 | Coates et al. |
| 2005/0256806 A1 | 11/2005 | Tien et al. |
| 2005/0262238 A1 | 11/2005 | Reeves et al. |
| 2005/0273456 A1 | 12/2005 | Revanuru et al. |
| 2005/0273645 A1 | 12/2005 | Satran et al. |
| 2005/0273843 A1* | 12/2005 | Shigeeda ............ H04L 63/0807 726/5 |
| 2005/0288939 A1 | 12/2005 | Peled et al. |
| 2006/0031374 A1 | 2/2006 | Lu et al. |
| 2006/0031520 A1 | 2/2006 | Bedekar et al. |
| 2006/0031778 A1 | 2/2006 | Goodwin et al. |
| 2006/0036764 A1 | 2/2006 | Yokota et al. |
| 2006/0045089 A1 | 3/2006 | Sadler et al. |
| 2006/0045096 A1 | 3/2006 | Farmer et al. |
| 2006/0047785 A1 | 3/2006 | Wang et al. |
| 2006/0059267 A1 | 3/2006 | Cugi et al. |
| 2006/0077902 A1 | 4/2006 | Kannan et al. |
| 2006/0077986 A1 | 4/2006 | Rune |
| 2006/0083205 A1 | 4/2006 | Buddhikot et al. |
| 2006/0095573 A1 | 5/2006 | Carle et al. |
| 2006/0100752 A1 | 5/2006 | Kim et al. |
| 2006/0106802 A1 | 5/2006 | Giblin et al. |
| 2006/0112176 A1 | 5/2006 | Liu et al. |
| 2006/0112272 A1 | 5/2006 | Morioka et al. |
| 2006/0112367 A1 | 5/2006 | Harris |
| 2006/0123210 A1 | 6/2006 | Pritchett et al. |
| 2006/0129684 A1 | 6/2006 | Datta |
| 2006/0130133 A1 | 6/2006 | Andreev et al. |
| 2006/0133374 A1 | 6/2006 | Sekiguchi |
| 2006/0135198 A1 | 6/2006 | Lee |
| 2006/0140193 A1 | 6/2006 | Kakani et al. |
| 2006/0153201 A1 | 7/2006 | Hepper et al. |
| 2006/0156416 A1 | 7/2006 | Huotari et al. |
| 2006/0161577 A1 | 7/2006 | Kulkarni et al. |
| 2006/0168070 A1 | 7/2006 | Thompson et al. |
| 2006/0171365 A1 | 8/2006 | Borella |
| 2006/0179153 A1 | 8/2006 | Lee et al. |
| 2006/0182103 A1 | 8/2006 | Martini et al. |
| 2006/0184647 A1 | 8/2006 | Dixit et al. |
| 2006/0209669 A1 | 9/2006 | Nishio |
| 2006/0209853 A1 | 9/2006 | Hidaka et al. |
| 2006/0229861 A1 | 10/2006 | Tatsuoka et al. |
| 2006/0230148 A1 | 10/2006 | Forecast et al. |
| 2006/0233106 A1 | 10/2006 | Achlioptas et al. |
| 2006/0235998 A1 | 10/2006 | Stecher et al. |
| 2006/0242300 A1 | 10/2006 | Yumoto et al. |
| 2006/0248194 A1 | 11/2006 | Ly et al. |
| 2006/0259320 A1 | 11/2006 | LaSalle et al. |
| 2006/0268692 A1 | 11/2006 | Wright et al. |
| 2006/0268704 A1 | 11/2006 | Ansari et al. |
| 2006/0270341 A1 | 11/2006 | Kim et al. |
| 2006/0282442 A1 | 12/2006 | Lennon et al. |
| 2006/0291483 A1 | 12/2006 | Sela |
| 2006/0294054 A1 | 12/2006 | Kudo et al. |
| 2007/0005807 A1 | 1/2007 | Wong |
| 2007/0006293 A1 | 1/2007 | Balakrishnan et al. |
| 2007/0016613 A1 | 1/2007 | Foresti et al. |
| 2007/0016662 A1 | 1/2007 | Desai et al. |
| 2007/0019636 A1 | 1/2007 | Lau et al. |
| 2007/0019658 A1 | 1/2007 | Park et al. |
| 2007/0038994 A1 | 2/2007 | Davis et al. |
| 2007/0044060 A1* | 2/2007 | Waller ................ G06F 17/5081 716/52 |
| 2007/0297410 A1 | 2/2007 | Yoon et al. |
| 2007/0050843 A1 | 3/2007 | Manville et al. |
| 2007/0058670 A1 | 3/2007 | Konduru et al. |
| 2007/0064661 A1 | 3/2007 | Sood et al. |
| 2007/0067373 A1 | 3/2007 | Higgins et al. |
| 2007/0067771 A1 | 3/2007 | Kulbak et al. |
| 2007/0083646 A1 | 4/2007 | Miller et al. |
| 2007/0088822 A1 | 4/2007 | Coile et al. |
| 2007/0104115 A1 | 5/2007 | Decasper et al. |
| 2007/0106796 A1 | 5/2007 | Kudo et al. |
| 2007/0107048 A1* | 5/2007 | Halls et al. ....................... 726/4 |
| 2007/0112775 A1 | 5/2007 | Ackerman |
| 2007/0118879 A1 | 5/2007 | Yeun |
| 2007/0124415 A1 | 5/2007 | Lev-Ran et al. |
| 2007/0124502 A1 | 5/2007 | Li |
| 2007/0130255 A1 | 6/2007 | Vvolovitz et al. |
| 2007/0147246 A1 | 6/2007 | Hurley et al. |
| 2007/0162891 A1 | 7/2007 | Burner et al. |
| 2007/0168320 A1 | 7/2007 | Borthakur et al. |
| 2007/0168525 A1 | 7/2007 | DeLeon et al. |
| 2007/0174491 A1 | 7/2007 | Still et al. |
| 2007/0192543 A1 | 8/2007 | Naik et al. |
| 2007/0220598 A1 | 9/2007 | Salowey et al. |
| 2007/0233809 A1 | 10/2007 | Brownell et al. |
| 2007/0233826 A1 | 10/2007 | Tindal et al. |
| 2007/0250560 A1 | 10/2007 | Wein et al. |
| 2007/0258451 A1 | 11/2007 | Bouat |
| 2007/0283023 A1 | 12/2007 | Ly et al. |
| 2007/0288484 A1 | 12/2007 | Yan et al. |
| 2007/0297551 A1 | 12/2007 | Choi |
| 2008/0004022 A1 | 1/2008 | Johannesson et al. |
| 2008/0008202 A1 | 1/2008 | Terrell et al. |
| 2008/0010372 A1 | 1/2008 | Khendouri et al. |
| 2008/0022059 A1 | 1/2008 | Zimmerer et al. |
| 2008/0025297 A1 | 1/2008 | Kashyap |
| 2008/0031258 A1 | 2/2008 | Acharya et al. |
| 2008/0034136 A1 | 2/2008 | Ulenas |
| 2008/0072303 A1 | 3/2008 | Syed |
| 2008/0120370 A1 | 5/2008 | Chan et al. |
| 2008/0120592 A1 | 5/2008 | Tanguay et al. |
| 2008/0133518 A1 | 6/2008 | Kapoor et al. |
| 2008/0133771 A1 | 6/2008 | Vardi et al. |
| 2008/0134311 A1 | 6/2008 | Medvinsky et al. |
| 2008/0141246 A1 | 6/2008 | Kuck et al. |
| 2008/0148340 A1 | 6/2008 | Powell et al. |
| 2008/0159145 A1 | 7/2008 | Muthukrishnan et al. |
| 2008/0165801 A1 | 7/2008 | Sheppard |
| 2008/0172488 A1 | 7/2008 | Jawahar et al. |
| 2008/0178278 A1 | 7/2008 | Grinstein et al. |
| 2008/0201599 A1 | 8/2008 | Ferraiolo et al. |
| 2008/0205613 A1 | 8/2008 | Lopez |
| 2008/0208917 A1 | 8/2008 | Smoot et al. |

(56) References Cited

U.S. PATENT DOCUMENTS

| | | |
|---|---|---|
| 2008/0209524 A1 | 8/2008 | Almog |
| 2008/0222646 A1 | 9/2008 | Sigal et al. |
| 2008/0225710 A1 | 9/2008 | Raja et al. |
| 2008/0228911 A1 | 9/2008 | Mackey |
| 2008/0229025 A1 | 9/2008 | Plamondon |
| 2008/0229415 A1 | 9/2008 | Kapoor et al. |
| 2008/0235508 A1 | 9/2008 | Ran et al. |
| 2008/0239986 A1 | 10/2008 | Ku et al. |
| 2008/0253395 A1 | 10/2008 | Pandya |
| 2008/0256224 A1 | 10/2008 | Kaji et al. |
| 2008/0263401 A1 | 10/2008 | Stenzel |
| 2008/0270578 A1 | 10/2008 | Zhang et al. |
| 2008/0279200 A1 | 11/2008 | Shatzkamer et al. |
| 2008/0281908 A1 | 11/2008 | McCanne et al. |
| 2008/0281944 A1 | 11/2008 | Vorne et al. |
| 2008/0282354 A1* | 11/2008 | Wobber et al. ............... 726/26 |
| 2008/0288661 A1 | 11/2008 | Galles |
| 2008/0301760 A1 | 12/2008 | Lim |
| 2008/0316922 A1 | 12/2008 | Riddle et al. |
| 2009/0028337 A1 | 1/2009 | Balabine et al. |
| 2009/0037998 A1 | 2/2009 | Adhya et al. |
| 2009/0049230 A1 | 2/2009 | Pandya |
| 2009/0070617 A1 | 3/2009 | Arimilli et al. |
| 2009/0077619 A1 | 3/2009 | Boyce |
| 2009/0080440 A1 | 3/2009 | Balyan et al. |
| 2009/0089487 A1 | 4/2009 | Kwon et al. |
| 2009/0094311 A1 | 4/2009 | Awadallah et al. |
| 2009/0094610 A1 | 4/2009 | Sukirya |
| 2009/0097480 A1 | 4/2009 | Curtis et al. |
| 2009/0106413 A1 | 4/2009 | Salo et al. |
| 2009/0119504 A1 | 5/2009 | van Os et al. |
| 2009/0125496 A1 | 5/2009 | Wexler et al. |
| 2009/0125532 A1 | 5/2009 | Wexler et al. |
| 2009/0125625 A1 | 5/2009 | Shim et al. |
| 2009/0125955 A1 | 5/2009 | DeLorme |
| 2009/0138314 A1 | 5/2009 | Bruce |
| 2009/0138749 A1 | 5/2009 | Moll et al. |
| 2009/0141891 A1 | 6/2009 | Boyen et al. |
| 2009/0144286 A1 | 6/2009 | Chatley et al. |
| 2009/0157678 A1 | 6/2009 | Turk |
| 2009/0161542 A1 | 6/2009 | Ho |
| 2009/0187915 A1 | 7/2009 | Chew et al. |
| 2009/0193126 A1 | 7/2009 | Agarwal et al. |
| 2009/0193513 A1 | 7/2009 | Agarwal et al. |
| 2009/0196282 A1 | 8/2009 | Fellman et al. |
| 2009/0217163 A1 | 8/2009 | Jaroker |
| 2009/0217386 A1 | 8/2009 | Schneider |
| 2009/0228956 A1 | 9/2009 | He et al. |
| 2009/0241176 A1 | 9/2009 | Beletski et al. |
| 2009/0248870 A1 | 10/2009 | Kamei et al. |
| 2009/0248893 A1 | 10/2009 | Richardson et al. |
| 2009/0265396 A1 | 10/2009 | Ram et al. |
| 2009/0265467 A1 | 10/2009 | Peles |
| 2009/0287935 A1 | 11/2009 | Aull et al. |
| 2009/0289828 A1 | 11/2009 | Hinchey |
| 2009/0292957 A1 | 11/2009 | Bower et al. |
| 2009/0296624 A1 | 12/2009 | Ryu et al. |
| 2009/0300161 A1 | 12/2009 | Pruitt et al. |
| 2009/0300407 A1 | 12/2009 | Kamath et al. |
| 2009/0316708 A1 | 12/2009 | Yahyaoui et al. |
| 2009/0319600 A1 | 12/2009 | Sedan et al. |
| 2010/0011434 A1 | 1/2010 | Kay |
| 2010/0017846 A1 | 1/2010 | Huang et al. |
| 2010/0023582 A1 | 1/2010 | Pedersen et al. |
| 2010/0042743 A1 | 2/2010 | Jeon et al. |
| 2010/0061232 A1 | 3/2010 | Zhou et al. |
| 2010/0064001 A1 | 3/2010 | Daily |
| 2010/0070476 A1 | 3/2010 | O'Keefe et al. |
| 2010/0071048 A1 | 3/2010 | Novak et al. |
| 2010/0093318 A1 | 4/2010 | Zhu et al. |
| 2010/0103820 A1 | 4/2010 | Fuller et al. |
| 2010/0115236 A1 | 5/2010 | Bataineh et al. |
| 2010/0122091 A1 | 5/2010 | Huang et al. |
| 2010/0131654 A1 | 5/2010 | Malakapalli et al. |
| 2010/0150154 A1 | 6/2010 | Viger et al. |
| 2010/0154031 A1 | 6/2010 | Montemurro et al. |
| 2010/0165877 A1 | 7/2010 | Shukla et al. |
| 2010/0179984 A1 | 7/2010 | Sebastian |
| 2010/0188976 A1 | 7/2010 | Rahman et al. |
| 2010/0189052 A1 | 7/2010 | Kavanagh et al. |
| 2010/0228814 A1 | 9/2010 | McKenna et al. |
| 2010/0228819 A1 | 9/2010 | Wei |
| 2010/0242092 A1 | 9/2010 | Harris et al. |
| 2010/0250497 A1 | 9/2010 | Redlich et al. |
| 2010/0251330 A1 | 9/2010 | Kroeselberg et al. |
| 2010/0261479 A1 | 10/2010 | Hidaka |
| 2010/0274772 A1 | 10/2010 | Samuels |
| 2010/0278733 A1 | 11/2010 | Karsten et al. |
| 2010/0299451 A1 | 11/2010 | Yigang et al. |
| 2010/0306169 A1 | 12/2010 | Pishevar et al. |
| 2010/0306827 A1 | 12/2010 | Esteve Balducci et al. |
| 2010/0322250 A1 | 12/2010 | Shelly et al. |
| 2010/0325277 A1 | 12/2010 | Muthiah et al. |
| 2011/0040889 A1 | 2/2011 | Garrett et al. |
| 2011/0047620 A1 | 2/2011 | Mahaffey et al. |
| 2011/0055921 A1 | 3/2011 | Narayanaswamy et al. |
| 2011/0066718 A1 | 3/2011 | Susai et al. |
| 2011/0066736 A1 | 3/2011 | Mitchell et al. |
| 2011/0072321 A1 | 3/2011 | Dhuse |
| 2011/0075592 A1 | 3/2011 | Beecroft |
| 2011/0075667 A1 | 3/2011 | Li et al. |
| 2011/0078303 A1 | 3/2011 | Li et al. |
| 2011/0098087 A1 | 4/2011 | Tseng |
| 2011/0107077 A1 | 5/2011 | Henderson et al. |
| 2011/0113095 A1 | 5/2011 | Hatami-Hanza |
| 2011/0153822 A1 | 6/2011 | Rajan et al. |
| 2011/0153985 A1 | 6/2011 | Pafumi et al. |
| 2011/0154443 A1 | 6/2011 | Thakur et al. |
| 2011/0185065 A1 | 6/2011 | Stanisic et al. |
| 2011/0173295 A1 | 7/2011 | Bakke et al. |
| 2011/0184733 A1 | 7/2011 | Yu et al. |
| 2011/0185082 A1 | 7/2011 | Thompson |
| 2011/0188415 A1 | 8/2011 | Graziano |
| 2011/0197059 A1 | 8/2011 | Klein et al. |
| 2011/0202676 A1 | 8/2011 | Craig et al. |
| 2011/0213911 A1 | 9/2011 | Eldus et al. |
| 2011/0225302 A1 | 9/2011 | Park et al. |
| 2011/0246800 A1 | 10/2011 | Accpadi et al. |
| 2011/0273984 A1 | 11/2011 | Hsu et al. |
| 2011/0277016 A1 | 11/2011 | Hockings et al. |
| 2011/0282700 A1* | 11/2011 | Cockcroft ............... G06Q 10/02 709/205 |
| 2011/0282997 A1 | 11/2011 | Prince et al. |
| 2011/0314178 A1 | 12/2011 | Kanode et al. |
| 2011/0321122 A1 | 12/2011 | Mwangi et al. |
| 2012/0016994 A1 | 1/2012 | Nakamura et al. |
| 2012/0030341 A1 | 2/2012 | Jensen et al. |
| 2012/0039341 A1 | 2/2012 | Latif et al. |
| 2012/0041965 A1 | 2/2012 | Vasquez et al. |
| 2012/0063314 A1 | 3/2012 | Pignataro et al. |
| 2012/0066489 A1 | 3/2012 | Ozaki et al. |
| 2012/0079055 A1* | 3/2012 | Robinson ............ H04L 61/1511 709/213 |
| 2012/0094631 A1 | 4/2012 | Pattabiraman |
| 2012/0101952 A1 | 4/2012 | Raleigh et al. |
| 2012/0102011 A1 | 5/2012 | Matsuki et al. |
| 2012/0117028 A1 | 5/2012 | Gold et al. |
| 2012/0124372 A1 | 5/2012 | Dilley et al. |
| 2012/0137020 A1 | 5/2012 | Ehlers |
| 2012/0150805 A1 | 6/2012 | Pafumi et al. |
| 2012/0158988 A1 | 6/2012 | Fatehpuria et al. |
| 2012/0191847 A1 | 7/2012 | Nas et al. |
| 2012/0195273 A1 | 8/2012 | Iwamura et al. |
| 2012/0198043 A1 | 8/2012 | Hesketh et al. |
| 2012/0224531 A1 | 9/2012 | Karuturi et al. |
| 2012/0254293 A1 | 10/2012 | Winter et al. |
| 2012/0257506 A1 | 10/2012 | BazIamacci et al. |
| 2012/0258766 A1 | 10/2012 | Cho et al. |
| 2012/0311153 A1 | 12/2012 | Morgan |
| 2012/0311174 A1 | 12/2012 | Bichot |
| 2012/0317266 A1 | 12/2012 | Abbott |
| 2013/0003106 A1 | 1/2013 | Lowery et al. |
| 2013/0029726 A1 | 1/2013 | Berionne et al. |
| 2013/0031060 A1 | 1/2013 | Lowery et al. |

(56) References Cited

U.S. PATENT DOCUMENTS

| | | | |
|---|---|---|---|
| 2013/0058229 | A1 | 3/2013 | Casado et al. |
| 2013/0073713 | A1 | 3/2013 | Collin et al. |
| 2013/0091002 | A1 | 4/2013 | Christie et al. |
| 2013/0114497 | A1 | 5/2013 | Zhang et al. |
| 2013/0163758 | A1 | 6/2013 | Swaminathan et al. |
| 2013/0182713 | A1 | 7/2013 | Giacomoni et al. |
| 2013/0198322 | A1 | 8/2013 | Oran et al. |
| 2013/0205361 | A1 | 8/2013 | Narayanaswamy et al. |
| 2013/0238472 | A1 | 9/2013 | Fan et al. |
| 2013/0290492 | A1 | 10/2013 | ElArabawy |
| 2013/0336122 | A1 | 12/2013 | Baruah et al. |
| 2013/0339519 | A1 | 12/2013 | Lientz |
| 2014/0025823 | A1 | 1/2014 | Szabo et al. |
| 2014/0040478 | A1 | 2/2014 | Hsu et al. |
| 2014/0059678 | A1 | 2/2014 | Parker |
| 2014/0071895 | A1 | 3/2014 | Bane et al. |
| 2014/0095661 | A1 | 4/2014 | Knowles et al. |
| 2014/0099945 | A1 | 4/2014 | Singh et al. |
| 2014/0105069 | A1 | 4/2014 | Potnuru |
| 2014/0162705 | A1 | 6/2014 | de Wit et al. |
| 2014/0171089 | A1 | 6/2014 | Janakiraman et al. |
| 2014/0187199 | A1 | 7/2014 | Yan et al. |
| 2014/0269484 | A1 | 9/2014 | Dankberg et al. |
| 2014/0286316 | A1 | 9/2014 | Park et al. |
| 2014/0317404 | A1 | 10/2014 | Carlson et al. |
| 2014/0379910 | A1 | 12/2014 | Saxena et al. |
| 2015/0058595 | A1 | 2/2015 | Gura et al. |
| 2015/0189010 | A1 | 6/2015 | van Bemmel |
| 2016/0006634 | A1 | 1/2016 | Li et al. |
| 2016/0028855 | A1 | 1/2016 | Goyal et al. |

FOREIGN PATENT DOCUMENTS

| | | |
|---|---|---|
| EP | 0744850 A2 | 11/1996 |
| EP | 1081918 A2 | 8/2000 |
| GB | 2489735 A | 10/2012 |
| JP | 6205006 A3 | 7/1994 |
| JP | 821924 B2 | 3/1996 |
| JP | 2000183935 A3 | 6/2000 |
| WO | WO 91/14326 | 9/1991 |
| WO | WO 95/05712 | 2/1995 |
| WO | WO 97/09805 | 3/1997 |
| WO | WO 97/45800 | 12/1997 |
| WO | WO 99/05829 | 2/1999 |
| WO | WO 99/06913 | 2/1999 |
| WO | WO 99/10858 | 3/1999 |
| WO | WO 99/39373 | 8/1999 |
| WO | WO 99/64967 | 12/1999 |
| WO | WO 00/04422 | 1/2000 |
| WO | WO 00/04458 | 1/2000 |
| WO | WO 00/58870 | 3/2000 |
| WO | WO 2002/39696 A2 | 5/2002 |
| WO | WO 2006/091040 A1 | 8/2006 |
| WO | WO 2012/136828 A1 | 10/2012 |

OTHER PUBLICATIONS

International Search Report and the Written Opinion, for International Patent Application No. PCT/US2011/058469, dated Oct. 3, 2015.

"A Process for Selective Routing of Servlet Content to Transcoding Modules," Research Disclosure 422124, Jun. 1999, pp. 889-890, IBM Corporation.

"BIG-IP Controller with Exclusive OneConnect Content Switching Feature Provides a Breakthrough System for Maximizing Server and Network Performance," F5 Networks, Inc. Press Release, May 8, 2001, 2 pages, F5 Network, Las Vegas, Nevada.

"Diameter MBLB Support Phase 2: Generic Message Based Load Balancing (GMBLB)", last accessed Mar. 29, 2010, pp. 1-10, (http://peterpan.f5net.com/twiki/bin/view/TMOS/TMOSDiameterMBLB).

"Market Research & Releases, CMPP PoC documentation", last accessed Mar. 29, 2010, (http://mainstreet/sites/PD/Teams/ProdMgmt/MarketResearch/Universal).

"Market Research & Releases, Solstice Diameter Requirements", last accessed Mar. 29, 2010, (http://mainstreet/sites/PD/Teams/ProdMgmt/MarketResearch/Unisversal).

"Respond to server depending on TCP::client_port", DevCentral Forums iRules, pp. 1-6, last accessed Mar. 26, 2010, (http://devcentral.f5.com/Default/aspx?tabid=53&forumid=5&tpage=1&v).

"Servlet/Applet/HTML Authentication Process With Single Sign-On," Research Disclosure 429128, Jan. 2000, pp. 163-164, IBM Corporation.

"Traffic Surges; Surge Queue; Netscaler Defense," 2005, PowerPoint Presentation, slides 1-12, Citrix Systems, Inc.

"UDDI Overview", Sep. 6, 2000, pp. 1-21, uddi.org, (http://www.uddi.org/).

"UDDI Technical White Paper," Sep. 6, 2000, pp. 1-12, uddi-org, (http://www.uddi.org/).

"UDDI Version 3.0.1", UDDI Spec Technical Committee Specification, Oct. 14, 2003, pp. 1-383, uddi.org, (http://www.uddi.org/).

"Windows Server 2003 Kerberos Extensions," Microsoft TechNet, 2003 (Updated Jul. 31, 2004), http://technet.microsoft.com/en-us/library/cc738207, Microsoft Corporation.

Abad, C., et al., "An Analysis on the Schemes for Detecting and Preventing ARP Cache Poisoning Attacks", IEEE, Computer Society, 27th International Conference on Distributed Computing Systems Workshops (ICDCSW'07), 2007, pp. 1-8.

Baer, T., et al., "The elements of Web services" ADTmag.com, Dec. 1, 2002, pp. 1-6, (http://www.adtmag.com).

Blue Coat, "Technology Primer: CIFS Protocol Optimization," Blue Coat Systems Inc., 2007, last accessed: Dec. 9, 2013, pp. 1-3, (http://www.bluecoat.com).

Borovick, Lucinda, "Addressing WAN Optimization in the Integrated Services Router", White Paper, Sponsored by: Cisco Systems, Oct. 2010, pp. 1-11, IDC.

Cisco Systems, "Cisco Performance Routing (PfR)", PfR: Technology_Overview, 2010, pp. 1-23.

Cisco Systems, "Cisco Performance Routing", Data Sheet, 2010, pp. 1-10.

Cisco Systems, "Cisco Wide Area Application Services Software Version 4.4 Technical Overview", White Paper, 2011, pp. 1-24.

Crescendo Networks, "Application Layer Processing (ALP)," 2003-2009, pp. 168-186, Chapter 9, CN-5000E/5500E, Foxit Software Company.

F5 Networks Inc., "3-DNS® Reference Guide, version 4.5", F5 Networks Inc., Sep. 2002, pp. 2-1-2-28, 3-1-3-12, 5-1-5-24, Seattle, Washington.

F5 Networks Inc., "Big-IP® Reference Guide, version 4.5", F5 Networks Inc., Sep. 2002, pp. 11-1-11-32, Seattle, Washington.

F5 Networks Inc., "Case Information Log for 'Issues with BoNY upgrade to 4.3'", as early as Feb. 2008.

F5 Networks Inc., "Configuration Guide for Local Traffic Management," F5 Networks Inc., Jan. 2006, version 9.2.2, 406 pgs.

F5 Networks Inc., "Deploying the BIG-IP LTM for Diameter Traffic Management," F5® Deployment Guide, Publication date Sep. 2010, Version 1.2, pp. 1-19.

F5 Networks Inc., "F5 Diameter RM", Powerpoint document, Jul. 16, 2009, pp. 1-7.

F5 Networks Inc., "F5 WANJet CIFS Acceleration", White Paper, F5 Networks Inc., Mar. 2006, pp. 1-5, Seattle, Washington.

F5 Networks Inc., "Routing Global Internet Users to the Appropriate Data Center and Applications Using F5's 3-DNS Controller", F5 Networks Inc., Aug. 2001, pp. 1-4, Seattle, Washington, (http://www.f5.com/f5producs/3dns/relatedMaterials/UsingF5.html).

F5 Networks Inc., "Using F5's 3-DNS Controller to Provide High Availability Between Two or More Data Centers", F5 Networks Inc., Aug. 2001, pp. 1-4, Seattle, Washington, (http://www.f5.com/f5products/3dns/relatedMaterials/3DNSRouting.html).

F5 Networks, Inc., "BIG-IP® Local Traffic Manager™: Implementations", F5 Networks, Inc., Jul. 8, 2015, Version 11.6, pp. 1-340.

Fajardo V., "Open Diameter Software Architecture," Jun. 25, 2004, pp. 1-6, Version 1.0.7.

Fielding et al., "Hypertext Transfer Protocol—HTTP/1.1," Network Working Group, RFC: 2068, Jan. 1997, pp. 1-162.

(56) References Cited

OTHER PUBLICATIONS

Fielding et al., "Hypertext Transfer Protocol—HTTP/1.1," Network Working Group, RFC: 2616, Jun. 1999, pp. 1-176, The Internet Society.
Floyd et al., "Random Early Detection Gateways for Congestion Avoidance," Aug. 1993, pp. 1-22, IEEE/ACM Transactions on Networking, California.
Gupta et al., "Algorithms for Packet Classification", Computer Systems Laboratory, Stanford University, CA, Mar./Apr. 2001, pp. 1-29.
Heinz G., "Priorities in Stream Transmission Control Protocol (SCTP) Multistreaming", Thesis submitted to the Faculty of the University of Delaware, Spring 2003, pp. 1-35.
Hochmuth, Phil, "F5, CacheFlow pump up content-delivery lines," Network World Fusion, May 4, 2001, 1 page, Las Vegas, Nevada.
Ilvesmaki M., et al., "On the capabilities of application level traffic measurements to differentiate and classify Internet traffic", Presented in SPIE's International Symposium ITcom, Aug. 19-21, 2001, pp. 1-11, Denver, Colorado.
International Search Report and the Written Opinion, for International Patent Application No. PCT/US2013/026615, dated Jul. 4, 2013.
International Search Report and the Written Opinion, for International Patent Application No. PCT/US2011/058469, dated May 30, 2012.
Internet Protocol,"DARPA Internet Program Protocol Specification", (RFC:791), Information Sciences Institute, University of Southern California, Sep. 1981, pp. 1-49.
Kawamoto, D., "Amazon files for Web services patent", CNET News.com, Jul. 28, 2005, pp. 1-2, (http://news.com).
LaMonica M., "Infravio spiffs up Web services registry idea", CNET News.com, May 11, 2004, pp. 1-2, (http://www.news.com).
MacVitte, Lori., "Message-Based Load Balancing" F5 Technical Brief, pp. 1-9, 2009.
MacVittie, L., "Why Not Network-Side Pre-Fetching?," 8 pp. (Apr. 14, 2009).
Modiano E., "Scheduling Algorithms for Message Transmission Over a Satellie Broadcast System," MIT Lincoln Laboratory Advanced Network Group, Nov. 1997, pp. 1-7.
Nichols K., et al., "Definition of the Differentiated Services Field (DS Field) in the IPv4 and IPv6 Headers", (RFC:2474) Network Working Group, Dec. 1998, pp. 1-19, (http://www.ietf.org/rfc/rfc2474.txt).
Ott D., et al., "A Mechanism for TCP-Friendly Transport-level Protocol Coordination", USENIX Annual Technical Conference, Jun. 10, 2002, University of North Carolina at Chapel Hill, pp. 1-12.
OWASP, "Testing for Cross site scripting", OWASP Testing Guide v2, Table of Contents, Feb. 24, 2011, pp. 1-5, (www.owasp.org/index.php/Testing_for_Cross_site_scripting).
Padmanabhan V., et al., "Using Predictive Prefetching to Improve World Wide Web Latency", SIGCOM, Jul. 1, 1996, pp. 1-15.

Raghavan B., et al., "Cloud Control with Distributed Rate Limiting", SIGCOMM'07, Aug. 27-31, 2007, pp. 1-11, Department of Computer Science and Engineering, University of California, San Diego, CA.
Riverbed Technology, "Riverbed Certified Solutions Professional (RCSP) Study Guide, Exam 199-01 for RiOS v5.0", Aug. 2009, Version 2.0.2, see pp. 30-67.
Riverbed Technology, "Riverbed Optimization System (RiOS) 6.1, A Technical Overview", White Paper, 2009, pp. 1-27.
Rosen E., et al., "MPLS Label Stack Encoding", (RFC:3032) Network Working Group, Jan. 2001, pp. 1-22, (http://www.ietf.org/rfc/rfc3032.txt).
Schaefer, Ken, "IIS and Kerberos Part 5—Protocol Transition, Constrained Delegation, S4U2S and S4U2P," Jul. 18, 2007, 21 pages, http://www.adopenstatic.com/cs/blogs/ken/archive/2007/07/19/8460.aspx.
Schilit B., "Bootstrapping Location-Enhanced Web Services", University of Washington, Dec. 4, 2003, (http://www.cs.washington.edu/news/colloq.info.html).
Seeley R., "Can Infravio technology revive UDDI?", ADTmag.com, Oct. 22, 2003, (http://www.adtmag com).
Shohoud, Y., "Building XML Web Services with VB .NET and VB 6", Addison Wesley, Sep. 2002, pp. 1-14.
Sleeper B., "The Evolution of UDDI", UDDI.org White Paper, The Stencil Group, Inc., Jul. 19, 2002, pp. 1-15, San Francisco, California.
Sleeper B., "Why UDDI Will Succeed, Quietly: Two Factors Push Web Services Forward", The Stencil Group, Inc., Apr. 2001, pp. 1-7, San Francisco, California.
Snoeren A., et al., "Managing Cloud Resources:Distributed Rate Limited", Building and Programming the Cloud Workshop, Jan. 13, 2010, pp. 1-38, UCSDCSE Computer Science and Engineering.
Sommers F., "Whats New in UDDI 3.0—Part 1", Web Services Papers, Jan. 27, 2003, pp. 1-4, (http://www.webservices.org/index.php/article/articleprint/871/-1/24/).
Sommers F., "Whats New in UDDI 3.0—Part 2", Web Services Papers, Mar. 2, 2003, pp. 1-8, (http://www.web.archive.org/web/20040620131006/).
Sommers F., "Whats New in UDDI 3.0—Part 3", Web Services Papers, Sep. 2, 2003, pp. 1-4, (http://www.webservices.org/index.php/article/articleprint/894/-1/24/).
Wang B., "Priority and realtime data transfer over the best-effort Internet", Dissertation Abstract,ScholarWorks@UMASS, Sep. 2005, pp. i-xiv and pp. 1-9.
Wikipedia, "Diameter (protocol)", pp. 1-11, last accessed Oct. 27, 2010, (http://en.wikipedia.org/wiki/Diameter_(protocol)).
Williams et al., "The Ultimate Windows Server 2003 System Administrator's Guide: Forwarding Authentication," 2003, 2 pages, Figure 10.7, Addison-Wesley Professional, Boston, Massachusetts.
Woo T.Y.C., "A Modular Approach to Packet Classification: Algorithms and Results", Nineteenth Annual Conference of the IEEE Computer and Communications Societies 3(3):1213-22, Mar. 26-30, 2000, abstract only, (http://ieeexplore.ieee.org/xpl/freeabs_all.jsp?arnumber=832499).

* cited by examiner

METHODS FOR DYNAMICALLY
CONSTRUCTING A SERVICE PRINCIPAL
NAME AND DEVICES THEREOF

STATEMENT OF RELATED APPLICATION

The present application claims the benefit of priority based on U.S. Provisional Patent Application Ser. No. 61/600,416, filed on Feb. 17, 2012 entitled "METHODS FOR DYNAMICALLY CONSTRUCTING A SERVICE PRINCIPAL NAME AND DEVICES THEREOF," which is hereby incorporated by reference.

BACKGROUND

Kerberos is a computer network authentication protocol which works on the basis of entitlement tokens called "tickets" to allow nodes communicating over a non-secure network to prove their identity to one another in a secure manner with shared trust with a third party called domain controller.

While performing Kerberos protocol transition for a user request, a network traffic management device acquires a Kerberos service ticket on behalf of the user using Kerberos constrained delegation mechanism for the destination backend server. The network traffic management device needs to know the service principal name (SPN) of server for being able to acquire the service ticket for the selected backend server.

In an environment where the network traffic management device is also doing traffic management functions for e.g. load balancing, the host name received from the user's incoming request does not correspond to the service principal name (SPN) of the destination backend server as the network traffic management device selects backend server based on various traffic management functionality and service principal name is unique for each selected backend server.

In the existing technologies, the administrators manually configure the service principal name for each backend server managed by network traffic management device. However, this approach has drawbacks of maintenance overhead. Additionally, it also does not work for those environments where a backend server is selected dynamically.

SUMMARY

In an aspect, a method for dynamically constructing a service principal name is disclosed. The method comprises receiving, at a network traffic management device, a client request from a user to access a service. The method comprises identifying, at the network traffic management device, an internet protocol (IP) address of a selected backend server to provide the requested service to the client. The method comprises determining, at the network traffic management device, a hostname of the selected backend server based at least on the identified IP address. The method comprises dynamically generating, at the network traffic management device, a service principal name (SPN) of the selected backend server based on the determined host name. The method comprises obtaining, at the network traffic management device, a service ticket from a domain controller server using at least the generated SPN of the selected backend server. The network traffic management device uses the obtained service ticket along with the client request to provide the user access to the selected backend server for the client request.

In an aspect, a non-transitory machine readable medium having stored thereon instructions for managing a user access to a requested service is disclosed. The medium comprises machine executable code which when executed by a processor of a network traffic management device, causes the network traffic management device to perform a method. The method comprises receiving a client request from a user to access a service. The method comprises identifying an internet protocol (IP) address of a selected backend server to provide the requested service to the client. The method comprises determining a hostname of the selected backend server based at least on the identified IP address. The method comprises dynamically generating a service principal name (SPN) of the selected backend server based on the determined hostname. The method comprises obtaining a service ticket from a domain controller server using at least the generated SPN of the selected backend server, wherein the network traffic management device uses the obtained service ticket along with the client request to provide the user access to the selected backend server for the client request.

In an aspect, a network traffic management device comprises a network interface configured to communicate with a plurality of network devices over a network. The device comprises a memory containing non-transitory machine readable medium comprising machine executable code having stored thereon instructions for managing a user access to a requested service. The device comprises a processor coupled to the network interface and the memory. The processor is configured to execute the code, which causes the network traffic management device to receive a client request from a user to access a service. The device is configured to identify an internet protocol (IP) address of a selected backend server to provide the requested service to the client. The device is configured to determine a hostname of the selected backend server based at least on the identified IP address. The device is configured to generate a dynamic service principal name (SPN) of the backend server, wherein the SPN is generated by at least using a regular expression of the determined hostname. The device is configured to obtain a ticket granting service (TGS) from a domain controller server using at least the generated SPN, the TGS being associated with at least the selected hostname and the client request. The network traffic management device uses the obtained TGS to provide the user access to the selected backend server for the client request.

In one or more above aspects, a load balancing technique is performed for the client request and the backend server is selected to handle the client request based on the performed load balancing technique.

In one or more above aspects, when the hostname of the selected backend server is determined, a DNS server is contacted and a reverse DNS lookup is performed in the DNS server using the identified IP address to determine the hostname of the selected backend server.

In one or more above aspects, a preconfigured pattern is applied to the determined hostname of the selected backend server to convert one or more portions of the hostname to the SPN usable by the domain controller server.

In one or more above aspects, the client request is modified to include the received service ticket in a header and the modified client request is sent to the selected backend server.

In one or more above aspects, a Ticket Granting Ticket (TGT) is obtained from the domain controller server for authenticating the network traffic management device in an associated realm of the backend server. A Ticket Granting Service (TGS) request is generated and sent to the domain controller server for the client request using the generated SPN, wherein the network traffic management device receives the service ticket in response to the TGS request.

While these examples are susceptible of embodiment in many different forms, there is shown in the drawings and will herein be described in detail preferred examples with the understanding that the present disclosure is to be considered as an exemplification and is not intended to limit the broad aspect to the embodiments illustrated.

DETAILED DESCRIPTION

Figure 1:
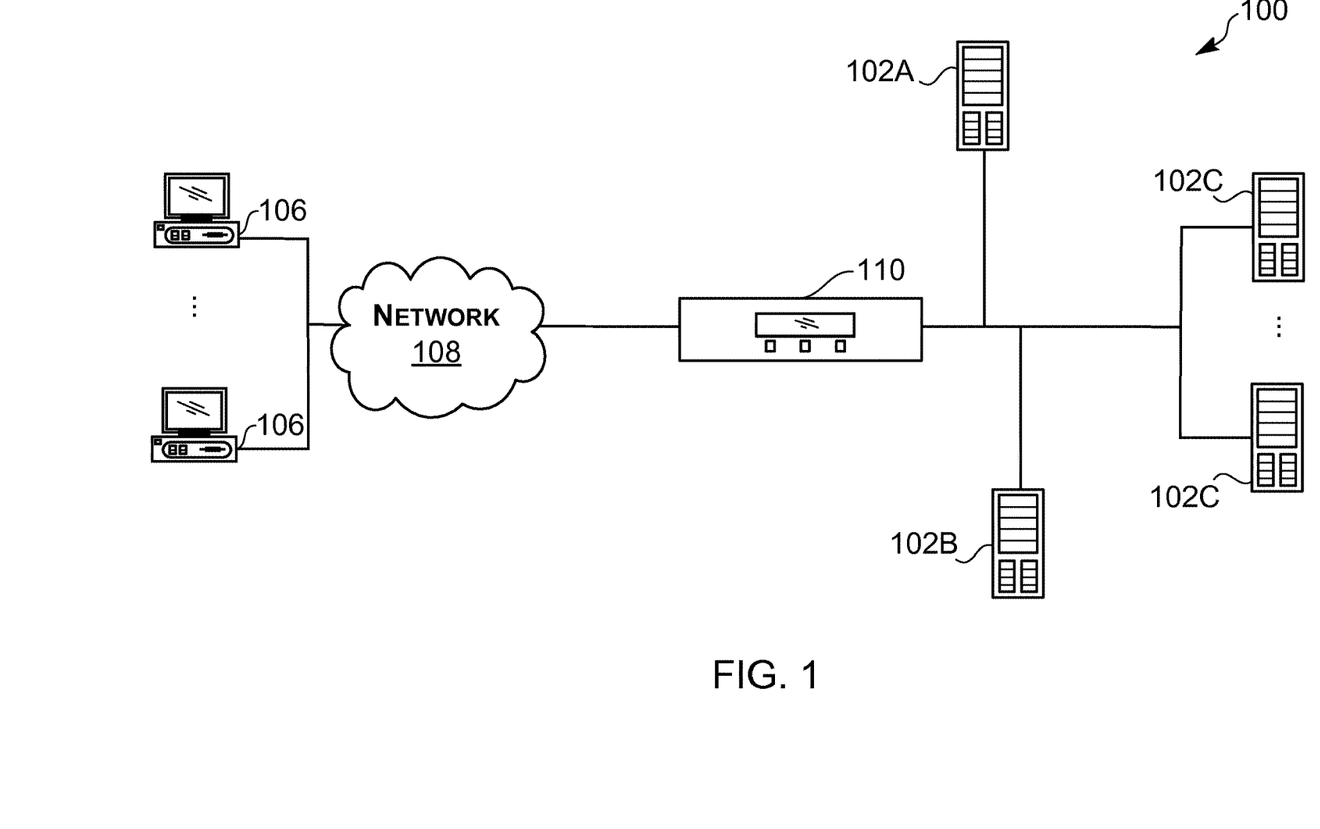
FIG. 1 is a diagram of an example system environment that includes a network traffic management device in accordance with an aspect of the present disclosure.

FIG. 1 is a diagram of an example system environment that includes a plurality of network traffic management devices in accordance with an aspect of the present disclosure. As shown in FIG. 1, the example system environment 100 employs a plurality of network devices comprising one or more client devices 106, one or more servers 102A-102C, and one or more network traffic management devices 110. The example system environment 100 may include other numbers and types of network devices in other arrangements. In particular, although only one network traffic management device 110 is shown in the environment 100, any number of network traffic management devices are contemplated.

The network traffic management device 110 communicates web based requests and responses with the client devices 106 via the wide area network (WAN) 108 and the servers 102A-102C via local area network (LAN) 104. Generally, requests sent over the network 108 from client devices 106 towards servers 102 are received and handled by the network traffic management device 110.

Client devices 106 comprise network devices capable of connecting to other network devices, such as network traffic management device 110 and servers 102A-102C. Such connections are performed over wired and/or wireless networks, such as network 108, to send and receive data, such as for Web-based and DNS requests, receiving responses to requests and/or performing other tasks. Non-limiting and non-exhausting examples of such client devices include personal computers (e.g., desktops, laptops, tablets), mobile and/or smart phones and the like. In an example, client devices 106 run Web browsers that may provide an interface for operators, such as human users, to interact with for making requests for resources (e.g. web objects, files) to web servers via the network 108, although other server resources may be requested by clients. One or more Web-based applications may run on one or more servers 102A-102C that provide the requested data back to one or more exterior network devices, such as client device 106, in the form of responses.

Network 108 comprises a publicly accessible network, such as the Internet; however, it is contemplated that the network 108 may comprise other types of private and public networks. Communications, such as requests from clients 106 and responses from servers 102, take place over the network 108 according to standard network protocols, such as the HTTP, HTTPS and TCP/IP protocols, for example. As per TCP/IP protocols, requests from client device 106 may be sent as one or more streams of data packets over the network 108 to one or more servers 102A-102C, via one or more network traffic management devices 110. Such protocols can be used by the network devices to establish connections, send and receive data for existing connections, and the like. However, the principles discussed herein are not limited to this example and can include other protocols. Further, it should be appreciated that network 108 may include local area networks (LANs), wide area networks (WANs), direct connections and any combination thereof, as well as other types and numbers of network types. On an interconnected set of LANs or other networks, including those based on differing architectures and protocols, routers, switches, hubs, gateways, bridges, and other intermediate network devices may act as links within and between LANs and other networks to enable messages and other data to be sent from and to network devices. Also, communication links within and between LANs and other networks typically include twisted wire pair (e.g., Ethernet), coaxial cable, analog telephone lines, full or fractional dedicated digital lines including T1, T2, T3, and T4, Integrated Services Digital Networks (ISDNs), Digital Subscriber Lines (DSLs), wireless links including satellite links and other communications links known to those skilled in the relevant arts. In essence, the network 108 utilizes any communication method by which data may travel between client devices 106, servers 102A-102C, the network traffic management device 110 and the like.

LAN 104 comprises a private local area network that includes the network traffic management device 110 coupled to the one or more servers 102A-102C, although the LAN 104 may comprise other types of private and public networks with other devices. Networks, including local area networks, besides being understood by those skilled in the relevant arts, have already been generally described above in connection with network 108 and thus will not be described further.

As shown in FIG. 1, the environment includes one or more domain controller servers 102A configured to handle Kerberos based authentication. Kerberos is a cryptographic system of mutual authentication which uses "tickets," where each entity (client and server) grants ultimate authority to, and shares an encryption key with, the domain controller server 102A configured to implement the Kerberos Key Distribution Center (KDC). The present system and method utilizes Kerberos Protocol Transition (KPT) and Constrained Delegation, which allows "delegation account" to authenticate with the KDC and obtain service tickets for other clients who are unable to contact the KDC directly. Both mechanisms enable clients, typically unable to get Kerberos tickets from the server's domain controller, to pass through the network traffic management device 110.

In particular, the delegation account is configured by the administrator in advance both in the servers' realm and on the network traffic management device 110 (using a distinct principal name and password distinct from the client account name and password). The delegation account, as well as the network traffic management device 110 which it represents, is trusted by the domain controller server 102A to authenticate the client by means other than Kerberos. This is called protocol transition as the non-Kerberos client requests and the network traffic management device's 110 communications are transitioned to operate in the Kerberos system to allow successful authentication between the network traffic management device 110 and the selected backend server 102C. Considering that the Kerberos domain controller server 102A delegates the authentication of clients to the network traffic management device 110, constrained delegation is performed as the domain controller server 102A trusts the network traffic management device 110 to authenticate on behalf of the client for access to the backend servers 102C.

Once the special delegation account is authenticated for the network traffic management device 110 in the Kerberos realm, the network traffic management device 110, on behalf of requesting client devices, is able to receive service tickets using dynamically generated service principal names (SPN) from the domain controller server 102A to access the backend servers' Kerberos realm for those client requests. The network traffic management device 110 can then utilize the service ticket to access the requested service running the Kerberos authentication system.

In an aspect, the DNS server 102B stores hostname and IP address information for a plurality of backend servers 102C. The DNS server 102B handles DNS requests from the network traffic management device 110 and allows the network traffic management device 110 to perform reverse DNS lookups using the IP address of one or more selected backend servers 102C to determine their hostname.

The backend servers 102C comprise one or more server computing machines capable of operating one or more Web-based and/or non Web-based applications that may be accessed by authenticated network devices (e.g. client devices, network traffic management devices). The servers 102C may provide other data representing requested resources, such as particular Web page(s), web object(s), image(s) of physical objects, and any other objects, responsive to requests from other network devices. It should be noted that one or more of the servers 102C may perform other tasks and provide other types of resources. It is also contemplated that one or more of the servers 102C may be a cluster of servers managed by one or more network traffic management devices 110.

It is to be understood that the one or more servers 102C may be hardware and/or software, and/or may represent a system with multiple servers that may include internal or external networks. In an aspect, the servers 102C are configured to provide requested services to users that are authenticated under the Kerberos system. In an aspect, the servers 102C may run any version of Microsoft® IIS servers or Apache® servers, although other types of servers may be used. \. Further, additional servers may be coupled to the network 108 and many different types of applications may be available on servers coupled to the network 108.

Generally, the one or more network traffic management devices 110 manage network communications, which may include one or more client requests and server responses, over the network 108 between the client device 106 and the servers 102A-102C. Client requests may be destined for one or more servers 102, and may take the form of one or more data packets over the network 108. The requests pass through one or more intermediate network devices and/or intermediate networks, until they ultimately reach the one or more network traffic management devices 110. In any case, the one or more network traffic management devices 110 may manage the network communications by performing several network traffic related functions involving the communications. Such functions include, but are not limited to, load balancing, access control, and validating HTTP requests. In particular to the present disclosure, the network traffic management device 110 is configured to dynamically construct a service principal name (SPN) for a destination backend server associated with a client request in conformance with the Kerberos authentication system, as will be described in more detail below.

Figure 2:
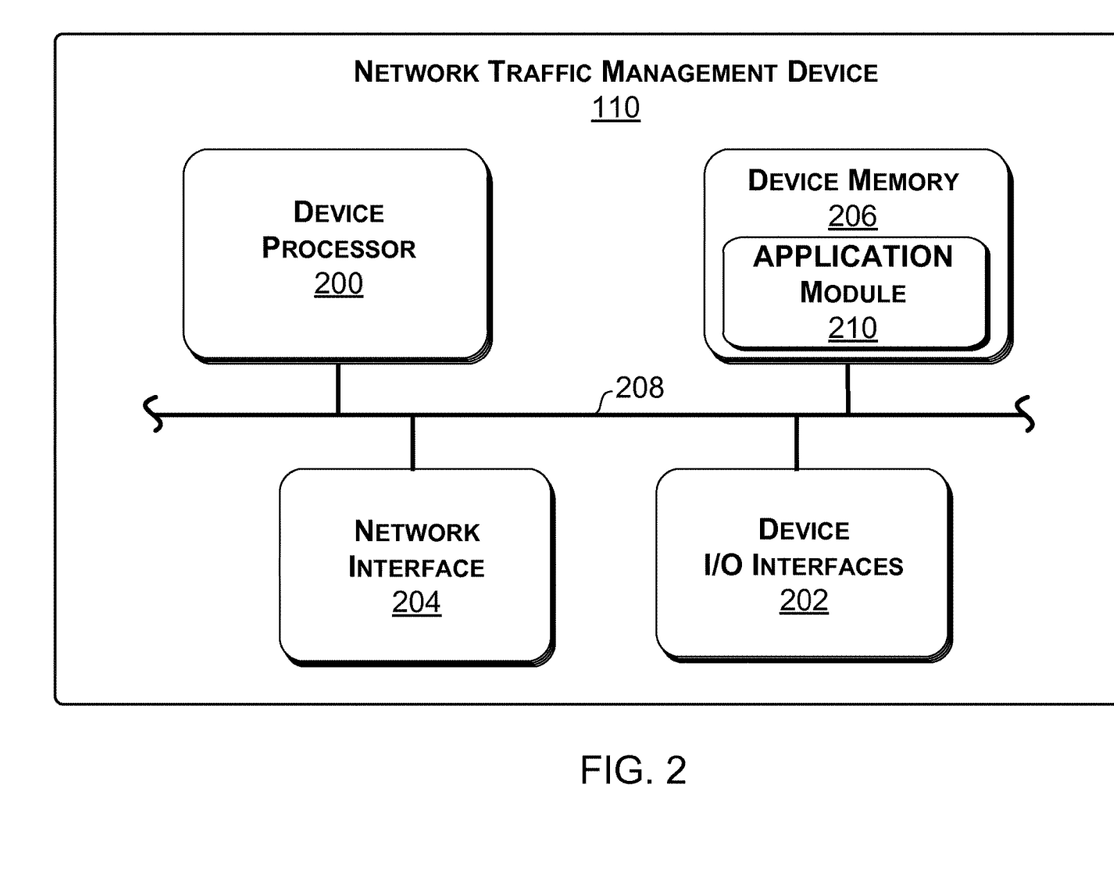
FIG. 2 is a block diagram of the network traffic management device in accordance with an aspect of the present disclosure.

FIG. 2 is a block diagram of a network traffic management device shown in FIG. 1 in accordance with the present disclosure. In particular, the network traffic management device 110 includes one or more device processors 200, one or more device I/O interfaces 202, one or more network interfaces 204 and one or more device memories 206, all of which are coupled together by bus 208. It should be noted that the network traffic management device could include other types and numbers of components.

Device processor 200 comprises one or more microprocessors configured to execute computer/machine readable and executable instructions stored in device memory 206, including an application module 210. Such instructions, when executed by one or more processors, implement network traffic management related functions of the network traffic management device 110. In addition, the instructions, when executed by one or more processors, implement the application module 210 to perform one or more portions of the processes illustrated in FIG. 3. The processor 200 may comprise other types and/or combinations of processors, such as digital signal processors, micro-controllers, application specific integrated circuits ("ASICs"), programmable logic devices ("PLDs"), field programmable logic devices ("FPLDs"), field programmable gate arrays ("FPGAs"), and the like.

Device I/O interface 202 comprises one or more user input and output device interface mechanisms. The interface may include a computer keyboard, mouse, touchscreen display device, and the corresponding physical ports and underlying supporting hardware and software to enable the network traffic management device 110 to communicate with the outside environment. Such communication may include accepting user data input and to provide user output, although other types and numbers of user input and output devices may be used. Additionally or alternatively, as will be described in connection with network interface 204 below, the one or more network traffic management devices 110 may communicate with the outside environment for certain types of operations (e.g., configuration) via a network management port.

Network interface 204 comprises one or more mechanisms that enable the one or more network traffic management devices 110 to engage in network communications over the LAN 104 and the network 108 using one or more desired protocols (e.g. TCP/IP, UDP, HTTP, RADIUS, DNS). However, it is contemplated that the network interface 204 may be constructed for use with other communication protocols and types of networks. Network interface 204 is sometimes referred to as a transceiver, transceiving device, or network interface card (NIC), which transmits and receives network data packets to one or more networks, such as LAN 104 and network 108. In an example where the one or more network traffic management devices 110 include more than one device processor 200 (or a processor 200 has more than one core), each processor 200 (and/or core) may use the same single network interface 204 or a plurality of network interfaces 204. Further, the network interface 204 may include one or more physical ports, such as Ethernet ports, to couple the one or more network traffic management devices 110 with other network devices, such as servers 102A-102C and clients 106. Moreover, the interface 204 may include certain physical ports dedicated to receiving and/or transmitting certain types of network data, such as device management related data for configuring the one or more network traffic management devices 110 and/or client request/server response related data.

Bus 208 comprises one or more internal device component communication buses, links, bridges and supporting components, such as bus controllers and/or arbiters. The bus enables the various components of the network traffic management device 110, such as the processor 200, device I/O interfaces 202, network interface 204, and device memory 206, to communicate with one another. However, it is contemplated that the bus may enable one or more components of the one or more network traffic management devices 110 to communicate with components in other devices as well. Example buses include HyperTransport, PCI, PCI Express, InfiniBand, USB, Firewire, Serial ATA (SATA), SCSI, IDE and AGP buses. However, it is contemplated that other types and numbers of buses may be used, whereby the particular types and arrangement of buses will depend on the particular configuration of the one or more network traffic management devices 110.

Device memory 206 comprises tangible, non-transitory, computer readable media, namely computer readable or processor readable storage media, which are examples of machine-readable storage media. Computer readable storage/machine-readable storage media may include volatile, nonvolatile, removable, and non-removable media implemented in any method or technology for storage of information. Such storage media includes computer readable/machine-executable instructions, data structures, program modules, or other data, which may be obtained and/or executed by one or more processors, such as device processor 200. Such instructions, when executed by one or more processors, causes or allows the network device to perform actions including implementing an operating system for controlling the general operation of the one or more network traffic management devices 110 to manage network traffic, implement the application module 210, and perform the process described in FIG. 3 in accordance with the present disclosure. Examples of computer readable storage media include RAM, BIOS, ROM, EEPROM, flash/firmware memory or other memory technology, CD-ROM, digital versatile disks (DVD) or other optical storage, magnetic cassettes, magnetic tape, magnetic disk storage or other magnetic storage devices, or any other medium which can be used to store the information.

Application module 210 is depicted in FIG. 2 as being within memory 206 for exemplary purposes only; it should be appreciated the module 210 may be alternatively located elsewhere. Generally, software executable instructions embodying the application module 210 are executed by the device processor 200 to execute a process to dynamically construct a service principal name (SPN) to allow the network traffic management device to perform Kerberos protocol transition using a Kerberos constrained delegation mechanism and accordingly allow the network traffic management device to sign or authenticate the user to the selected backend server.

Figure 3:
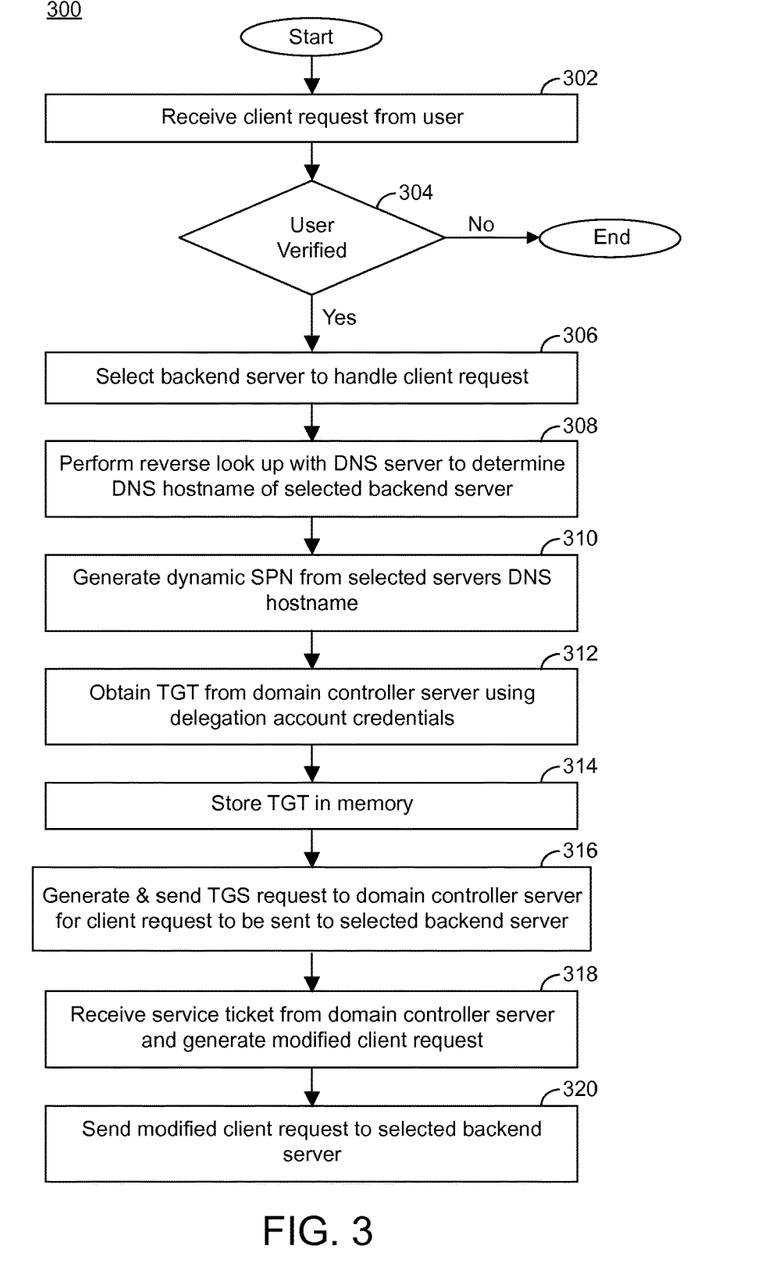
FIG. 3 is an example flow chart diagram depicting at least a portion of the process performed by the network traffic management device in accordance with an aspect of the present disclosure.

FIG. 3 illustrates an example flow chart describing at least a portion of a method performed by the network traffic management device in accordance with an aspect of the present disclosure. It should be noted one or more of the steps described in FIG. 3 may be performed by one or more processors 200 executing programmable instructions in the form of software and/or hardware implemented in the application module 210 of the network traffic management device 110.

As shown in FIG. 3, the network traffic management device 110 initially receives a request from a client device, on behalf of a user, wherein the request asks for access to a service from one or more backend servers and/or applications (Block 302). The network traffic management device then determines whether the user is already authenticated based on one or more user credentials, although the user may be validated in other techniques also. (Block 304). If so, the process ends.

In contrast, if the user is not already authenticated, the network traffic management device 110 performs traffic management functions such as load balancing and selects one or more backend servers 102C to handle the client request (Block 306). The appropriate backend server 102C is selected by the network traffic management device 110 based on the service it provides and/or based on the specific traffic management mechanism configured on the network traffic management device 110 as well as other known load balancing techniques.

Once the backend server 102C is selected by the network traffic management device 110, the network traffic management device 110 uses the known the internet protocol (IP) address of the selected server 102C to perform a reverse DNS lookup for the selected backend server 102 (Block 308). From the reverse DNS lookup, the network traffic management device 110 is then able to obtain the DNS hostname of the selected backend server 102C.

Using the selected backend server's DNS hostname, the network traffic management device 110 applies a pre-configured pattern to convert the DNS hostname and generate the dynamic service principal name (SPN) of the selected backend server 102 (Block 310). In an aspect, the pre-configured pattern may be a regular expression, although it is contemplated that the pre-configured pattern can be a simpler format string. In an example where the pre-configured pattern is a format string, consider HTTP/%s@ACME.COM. The "HTTP" is a literal string representing service type; the "% s" is a format sequence that is to be replaced with backend server's 102C hostname; and "ACME.COM" is an actual selected backend server's Kerberos realm.

Accordingly, the format sequence "% s" is replaced with the backend server's 102C DNS hostname. The process described assumes that all the generated SPNs for all backend servers 102 in the particular load balancing pool comply to the given SPN pattern.

This dynamic generation of the SPN by the network traffic management device 110 is advantageous, as prior methods required the SPNs to be preconfigured in advance by the administrator for each backend server before the client request was received by the network traffic management device 110. The prior methods required the SPNs to be preconfigured in advance to allow the network traffic management device 110 to know which SPN was to be used, based on the backend server 102C, when obtaining a service ticket from the domain controller server 102A.

Once the network traffic management device 110 generates the SPN for the selected backend server 102C, the network traffic management device 110 communicates with the domain controller server 102A to obtain a Ticket Granting Ticket (TGT) using the credentials of the network traffic management device's Kerberos realm delegation account (Block 312). The TGT, as such, is not related to the client's account or password associated with the request to the backend server. Thus, the TGT proves the identity of the network traffic management device 110, with respect to the Kerberos realm, when it gets service tickets on behalf of the client device 106.

Once the network traffic management device 110 receives the TGT from the domain controller server 102A, the received TGT stored in the network traffic management device's 110 memory 206 (Block 314). The network traffic management device 110 uses the stored TGT when getting service tickets for some or all client requests to the backend servers 102C in the Kerberos realm and does not have to obtain another TGT until it expires (after usually 10 hours).

The network traffic management device 110 thereafter generates a Ticket Granting Service (TGS) request containing the dynamically generated backend server's SPN, the client user's principal name, and the previously obtained TGT. The TGS is sent from the network traffic management device 110 to the domain controller 102A to obtain a service ticket associated with the specific client request to access the selected backend server 102C (Block 316). The network traffic management device 110 provides the stored TGT with the TGS as evidence of authentication of the delegation account when it contacts the domain controller 102A to obtain the service ticket.

Thereafter, the network traffic management device 110 receives a service ticket from the domain controller server 102A in response to the TGS request previously sent by the network traffic management device 110. The service ticket is an encrypted file that has a limited validity period that is specific to and associated with the client request, the service requested in the client request, the user's credentials and information of the selected backend server 102. In particular to an aspect, the service ticket contains the selected backend server's 102C SPN and user's identity, encrypted with the backend server's key. The network traffic management device 110 thereafter modifies the client request by attaching the received service ticket to the client request in a special HTTP header (Block 318).

The modified client request is then sent from the network traffic management device 110 to the selected backend server 102C (Block 320). The backend server 102C, upon receiving the modified client request, is able to decrypt the modified client request and confirm the identity of the user.

Having thus described the basic concept of the present disclosure, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the novel inventive matter. Additionally, the recited order of processing elements or sequences, or the use of numbers, letters, or other designations therefore, is not intended to limit the claimed processes to any order except as may be specified in the claims.

What is claimed is:

1. A method for managing access to services implemented by a network traffic management system comprising one or more network traffic management devices, client devices, backend server devices, or domain controller server devices, the method comprising:

selecting one of a plurality of backend servers to provide a service to a client, and identifying an Internet protocol (IP) address of the selected server, in response to a received request from the client to access the service;

performing a reverse domain name system (DNS) lookup with a DNS server using the identified IP address to determine a hostname of the selected server;

dynamically generating a service principal name (SPN) of the selected server based on the hostname determined via the reverse DNS lookup;

sending a ticket granting service (TGS) request to a domain controller server, wherein the TGS request is generated using the dynamically generated SPN and a previously obtained ticket granting ticket (TGT); and providing access to the selected server to the client using a service ticket obtained in response to the TGS request and comprising the SPN.

2. The method of claim 1 further comprising:

performing a load balancing technique for the request; and selecting the server to handle the request based on the load balancing technique.

3. The method of claim 1 wherein the generating the SPN further comprises modifying a preconfigured pattern by replacing one or more format sequences in the preconfigured pattern and applying the preconfigured pattern to the determined hostname of the selected server to convert one or more portions of the hostname to the SPN.

4. The method of claim 1 further comprising:

modifying the received client request by attaching the obtained service ticket in a header of the request; and forwarding the modified request to the selected server to facilitate decrypting the modified request to confirm an identity associated with the client and providing access to the selected server to the client.

5. A non-transitory computer readable medium having stored thereon instructions for managing access to services comprising executable code which when executed by at least one processor, causes the processor to:

select one of a plurality of servers to provide a service to a client, and identify an Internet protocol (IP) address of the selected server, in response to a received request from the client to access the service;

perform a reverse domain name system (DNS) lookup with a DNS server using the identified IP address to determine a hostname of the selected server;

dynamically generate a service principal name (SPN) of the selected server based on the hostname determined via the reverse DNS lookup;

send a ticket granting service (TGS) request to a domain controller server, wherein the TGS request is generated using the dynamically generated SPN and a previously obtained ticket granting ticket (TGT); and provide access to the selected server to the client using a service ticket obtained in response to the TGS request and comprising the SPN.

6. The non-transitory computer readable medium of claim 5, wherein the executable code when executed by the processor further causes the processor to:

perform a load balancing technique for the request; and select the server to handle the request based on the load balancing technique.

7. The non-transitory computer readable medium of claim 5, wherein the executable code when executed by the processor further causes the processor to modify a preconfigured pattern by replacing one or more format sequences in the preconfigured pattern and apply the preconfigured pattern to the determined hostname of the selected server to convert one or more portions of the hostname to the SPN.

8. The non-transitory computer readable medium of claim 5, wherein the executable code when executed by the processor further causes the processor to:
modify the received request by attaching the obtained service ticket in a header of the request; and
forward the modified client request to the selected server to facilitate decrypting the modified request to confirm an identity associated with the client and providing access to the selected server to the client.

9. A network traffic management device comprising a memory comprising programmed instructions stored thereon and at least one processor configured to be capable of executing the stored programmed instructions to:
select one of a plurality of backend servers to provide a service to a client, and identify an Internet protocol (IP) address of the selected server, in response to a received request from the client to access the service;
perform a reverse domain name system (DNS) lookup with a DNS server using the identified IP address to determine a hostname of the selected server;
dynamically generate a service principal name (SPN) of the selected server based on the hostname determined via the reverse DNS lookup;
send a ticket granting service (TGS) request to a domain controller server, wherein the TGS request is generated using the dynamically generated SPN and a previously obtained ticket granting ticket (TGT);
and
provide access to the selected server to the client using a service ticket obtained in response to the TGS request and comprising the SPN.

10. The network traffic management device of claim 9, wherein the processor is further configured to be capable of executing the stored programmed instructions to:
perform a load balancing technique for the request; and
select the server to handle the request based on the load balancing technique.

11. The network traffic management device of claim 9, wherein the processor is further configured to be capable of executing the stored programmed instructions to modify preconfigured pattern by replacing one or more format sequences in the preconfigured pattern and apply the preconfigured pattern to the determined hostname of the selected server to convert one or more portions of the hostname to the SPN.

12. The network traffic management device of claim 9, wherein the processor is further configured to be capable of executing the stored programmed instructions to:
modify the received request by attaching the obtained service ticket in a header of the request; and
forward the modified request to the selected server to facilitate decrypting the modified request to confirm an identity associated with the client and providing access to the selected server to the client.

13. A network traffic management system, comprising one or more traffic management devices, client devices, server devices, or domain controller server devices, the network traffic management system comprising memory comprising programmed instructions stored thereon and at least one processor configured to be capable of executing the stored programmed instructions to:
select one of a plurality of backend servers to provide a service to a client, and identify an Internet protocol (IP) address of the selected server, in response to a received request from the client to access the service;
perform a reverse domain name system (DNS) lookup with a DNS server using the identified IP address to determine a hostname of the selected server;
dynamically generate a service principal name (SPN) of the selected server based on the hostname determined via the reverse DNS lookup;
send a ticket granting service (TGS) request to a domain controller server, wherein the TGS request is generated using the dynamically generated SPN and a previously obtained ticket granting ticket (TGT);
and
provide access to the selected server to the client using a service ticket obtained in response to the TGS request and comprising the SPN.

14. The system of claim 13, wherein the processor is further configured to be capable of executing the stored programmed instructions to:
perform a load balancing technique for the request; and
select the backend server to handle the request based on the load balancing technique.

15. The system of claim 13, wherein the processor is further configured to be capable of executing the stored programmed instructions to modify a preconfigured pattern by replacing one or more format sequences in the preconfigured pattern and apply the preconfigured pattern to the determined hostname of the selected server to convert one or more portions of the hostname to the SPN.

16. The system of claim 13, wherein the processor is further configured to be capable of executing the stored programmed instructions to:
modify the received client request by attaching the obtained service ticket in a header of the request; and
forward the modified client request to the selected server to facilitate decrypting the modified request to confirm an identity associated with the client and providing access to the selected server to the client.

* * * * *